United States Patent
Dasher et al.

(10) Patent No.: US 12,532,160 B2
(45) Date of Patent: Jan. 20, 2026

(54) SYSTEMS AND METHODS FOR PROVISIONING A DEVICE AND ADAPTING APPLICATIONS IN BANDWIDTH-RESTRICTED NETWORKS

(71) Applicant: Adeia Guides Inc., San Jose, CA (US)

(72) Inventors: Charles Dasher, Lawrenceville, GA (US); Reda Harb, Tampa, FL (US); Ning Xu, Irvine, CA (US)

(73) Assignee: Adeia Guides Inc., San Jose, CA (US)

( * ) Notice: Subject to any disclaimer, the term of this patent is extended or adjusted under 35 U.S.C. 154(b) by 36 days.

(21) Appl. No.: 18/748,673

(22) Filed: Jun. 20, 2024

(65) Prior Publication Data

US 2025/0392906 A1   Dec. 25, 2025

(51) Int. Cl.
*H04W 12/03*     (2021.01)
*H04W 8/20*      (2009.01)
*H04W 12/069*    (2021.01)
H04W 84/06       (2009.01)

(52) U.S. Cl.
CPC ........... *H04W 12/03* (2021.01); *H04W 8/205* (2013.01); *H04W 12/069* (2021.01); *H04W 84/06* (2013.01)

(58) Field of Classification Search
CPC ... H04W 12/03; H04W 8/205; H04W 12/069; H04W 84/06
USPC ........................................................ 380/270
See application file for complete search history.

(56) References Cited

U.S. PATENT DOCUMENTS

2016/0345162 A1* 11/2016 Li .............................. H04W 8/18
2021/0160683 A1*  5/2021 Li ............................ H04W 12/72
2025/0193652 A1*  6/2025 Padova ................. H04W 8/183

OTHER PUBLICATIONS

About eSIM on iPhone, available online at: <https://support.apple.com/en-us/118669#:~:text=On%20your%20iPhone%2C%20go%20to,by%20scanning%20a%20QR%20code.>, Jun. 21, 2024, 4 pages.
QUIC, IETF QUIC Protocol, available online at: <https://datatracker.ietf.org/wg/quic/about/>, retrieved on Jul. 17, 2024, 1 page.

(Continued)

*Primary Examiner* — Tan Doan
(74) *Attorney, Agent, or Firm* — HALEY GUILIANO LLP

(57) ABSTRACT

Embodiments herein provide a system and method for provisioning a device to use a telecommunications service offered by a provider for a satellite communications (SATCOM) network. The device performs a handshake with the SATCOM network to establish trust, such as by sending an encrypted handshake request to the SATCOM network or operator of the SATCOM network. The SATCOM network acts as a proxy for a satellite network provider and the device communicates with the provider, using information from a proxy certificate for the provider, through the SATCOM network. The device requests and receives an e-SIM profile for the provider. The device also receives a certificate of the satellite network provider and sends a selection or confirmation of an e-SIM profile. The device receives an e-SIM or a configuration corresponding to the selected e-SIM, which is used to access the SATCOM network though the satellite network provider.

20 Claims, 20 Drawing Sheets

(56) References Cited

OTHER PUBLICATIONS

Satellite Beacons, Some of the material here was first presented at the Third National Space Engineering Symposium, available online at: <https://www.spaceacademy.net.au/spacelink/satbons/satbons.htm#:~:text=Satellite%20beacons%20%20used%20for%20ionospheric,300%20%2D%203000%20MHZ)%20bands.>, Jun. 30-Jul. 2, 1987, 5 pages.

T- Mobile SpaceX, "First SpaceX Satellites Launch for Breakthrough Direct to Cell Service with T-Mobile", Press Release, available online at: <https://www.t-mobile.com/news/un-carrier/first-spacex-satellites-launch-for-breakthrough-direct-to-cell-service-with-t-mobile>, Jan. 3, 2024, 1 page.

Use Emergency SOS via satellite on your iPhone, available online at: <https://support.apple.com/en-us/101573>, Apr. 24, 2024, 1 page.

\* cited by examiner

SYSTEMS AND METHODS FOR PROVISIONING A DEVICE AND ADAPTING APPLICATIONS IN BANDWIDTH-RESTRICTED NETWORKS

BACKGROUND

This disclosure is related to systems and methods for connecting a device to a satellite network, and in particular, connecting without prior knowledge of providers associated with the satellite network.

SUMMARY

Devices may connect to different types of terrestrial networks to communicate or exchange data. Such networks provide network coverage to populous areas or along well-traveled roads. However, terrestrial networks may not provide coverage for less populated areas, unpopulated or remote areas, or roads that are less traveled. Some terrestrial networks use wireless signals to provide coverage. Factors, such as terrain, landscape, materials, and atmospheric conditions, may block or interfere with the wireless signals and adversely affect the reliability of the coverage provided by the terrestrial networks.

A device may connect to a new network that provides coverage in an area where a current terrestrial network does not. However, the device may need to be provisioned in order to connect to the new network. The provisioning process may require the device to have network coverage to facilitate authentication and/or validation of the device and the new network. A secure connection may also be required to protect the privacy and data of the devices connected to the network and communication between the network and the device. Thus, a means for securely provisioning a device to a new network when terrestrial networks are not able to provide reliable coverage is needed.

In one approach, a device, such as a satellite phone, may be designed to solely connect to a satellite communication (SATCOM) network to communicate or exchange data. Since satellites of the satellite network are positioned above the Earth, factors that block or interfere with wireless signals in terrestrial networks may not adversely affect connectivity with the SATCOM network. Thus, the SATCOM network may provide coverage in areas where terrestrial networks are not able to provide reliable coverage.

The satellite phone may be pre-provisioned to a network provider known to the SATCOM network. When pre-provisioned, the phone may be able to send and receive wireless signals to and from a satellite of the SATCOM network out of the box or upon startup. The satellite phone may also be provisioned by entering information into the satellite phone to be sent to the known satellite network provider. While this approach provides coverage in areas where terrestrial networks are not able to provide reliable coverage, it does not provide such coverage without prior knowledge of a satellite network provider. Further, since a specialty-purpose device, such as a satellite phone, is required to connect to the satellite network provider, the approach may not provide coverage for devices designed to connect to terrestrial networks and may require a separate device.

In another approach, a device, such as a mobile phone, may connect to a second terrestrial network when a first terrestrial network is unavailable. A provider of the second terrestrial network may offer telecommunications service in areas where a provider of the first terrestrial network does not. However, the mobile phone must have network coverage, such as through the first terrestrial network or another terrestrial network, to be provisioned to the provider of the second terrestrial network. The device is also required to have pre-existing knowledge of the provider for the second terrestrial network in order to be provisioned to the second terrestrial network.

During the provisioning process, the mobile phone may use the first terrestrial network to communicate with, and verify the identity of, the provider of the second terrestrial network. The second terrestrial network provider may do the same for the mobile phone. Once identities are confirmed and trust is established, encrypted communication may begin. While this approach may provide secure network coverage in areas that may not be covered by the first network, it does not provide a way to provision the mobile phone in areas where terrestrial networks are unavailable. Thus, this approach may not be used to provide service when the mobile phone is located in an area without service.

In another approach, a device, such as a mobile phone, may use a direct-to-cell service to connect to a SATCOM network. A satellite network provider may provide the direct-to-cell service to communicate or exchange data using the SATCOM network. However, the mobile phone must first be provisioned to the SATCOM network through a different network, such as a terrestrial network, before the phone can use the direct-to-cell service. Thus, the mobile phone is required to have pre-existing knowledge of the satellite network provider in order to connect to the SATCOM network. While this approach offers service in areas that terrestrial networks may not cover, it presents the same challenges previously discussed in relation to connecting to a second terrestrial network.

The previously described approaches require knowledge of the provider of the network to connect. Provisioning a device to a new provider requires the device to have information specific to the provider, such as access codes, digital certificates, or encryption keys, in order to ensure authentication of the provider and secure communication with the provider.

Further, the second terrestrial network or SATCOM network may provide bandwidth, speed, or usage restrictions for a device that are less than that of the previously used network, such as the first terrestrial network. The device may accommodate for such restrictions using "data saver," "low data," "battery saver," or "low power" modes. Such modes may indiscriminately limit functionality of applications, turn off routine background tasks, or stop performing some automatic activities like automatic video playback, automatic updates, and automatic photo backup. While this approach accounts for limited data networks, it does not adjust functionality of the applications to account for the restrictions while allowing the applications to perform the intended functions. Users of devices or recipients of communications from the applications may not be aware of the network restrictions, which may result in confusion for the user or the recipient when data saving modes are implemented. In some examples, a messaging application may prioritize messages based on (i) message size or (ii) a network timestamp indicating when the network received the message. Since message size may vary and the timestamp recorded when network service is available may not match the time when a message was sent, the recipient may receive the messages out of order or sequence.

Accordingly, there is a need to provide a way to securely provision a device to connect to a network, such as a SATCOM network, without prior knowledge of a network provider for the network. Such a solution may leverage digital certificates that are pre-installed on the device to initialize communication with the network, and encrypted communication to receive a provisioning profile to connect to a network provider for the network. There is also a need to adjust functionality of applications to accommodate restrictions on network usage while permitting the desired functionality of the applications. Such a solution may leverage adjusting the quality of, or limiting the type of, media assets sent over the restricted network by the applications, and may also retroactively update the media assets once the restrictions are no longer present.

To solve these problems, systems and methods are provided herein for securely provisioning a device to a new network provider without connectivity or service to a network. Additional systems and methods are provided herein for adjusting functionality of applications running on the device to account for bandwidth, speed, or data limitations imposed by the network.

In one approach, a system is provided for provisioning a device to use service offered by a provider for a SATCOM network. The approach uses a digital identity module, such as an e-SIM, to allow provisioning without requiring identity module hardware specific to a provider, such as a subscriber identity module (SIM) card. The device performs a handshake with the SATCOM network to establish trust, such as by sending an encrypted handshake request to the SATCOM network or operator of the SATCOM network. The device receives and verifies a proxy certificate from the SATCOM network. The SATCOM network acts as a proxy for a satellite network provider and the device communicates with the provider, using the information from the proxy certificate, through the SATCOM network.

The device requests and receives an e-SIM profile for the provider. In some implementations, the request is encrypted using information from the proxy certificate. In some implementations, the e-SIM profile provides limitations, restrictions, or terms of service for the satellite network provider. The device also receives a certificate of the satellite network provider and sends a selection or confirmation of an e-SIM profile. In some implementations, the selection is encrypted using the certificate of the satellite network provider. The device receives an e-SIM or a configuration corresponding to the selected e-SIM, which is used to access the SATCOM network though the satellite network provider. Thus, the system provides a means for provisioning a device to connect to a SATCOM network when no other service is available. The device may securely connect to the SATCOM network through a satellite network provider without having any prior knowledge of the provider or any pre-existing contract with the provider. Such provisioning may be useful to a user of the device that may be in an unknown location without any service from previously used network providers.

In some embodiments, the satellite network providers available to the device are based on a satellite to which the device is connected. In some implementations, the available satellite network providers are based on a swath or coverage area of the satellite. Changing the providers based on the swath allows operators of SATCOM networks to comply with geographic constraints for the providers, and may ensure the device can connect to an appropriate provider based on the location of the device.

In another approach, the system predicts when service, for the device, with a current network will degrade or drop. The system monitors a signal strength of the device while connected to the current network. A position of the device is also monitored. If the signal strength is predicted to fall below a signal threshold, and/or the position of the device is predicted to enter an area having limited or no coverage, then the device automatically begins the process to provision to a new provider and/or a new network. In some implementations, the system uses a coverage map for the current provider with the device's position to predict service will degrade or drop. In some implementations, the device performs any one of: receiving a certificate for the new provider offering coverage in the area having no coverage with the current network, initiating the handshake request with the new network, or receiving an e-SIM for the new provider. Automatically provisioning the device with the new provider may ensure the device has continuous coverage when the current network is inaccessible. The provisioning may also provide the device with the option to connect to the new provider.

In another approach, the system prioritizes communication with websites based on transport protocols. In some implementations, the system prioritizes access, for the device, to websites that support the QUIC network protocol over websites that do not support the QUIC network protocol. In some implementations, the system prioritizes websites supporting the QUIC protocol that are presented to the device, in response to a search query by the device, over websites that do not support the QUIC network protocol. Prioritizing websites based on the QUIC protocol may enable faster connection and reduced time to start secure communications between the device and servers when compared to non-QUIC supported websites. The QUIC protocol may also enable real-time applications such as video streaming, online gaming, and voice services that may otherwise not be possible over networks with limitations.

In another approach, the system modifies a media asset based on characteristics of a connection of a first device with a network. The characteristics include any of bandwidth, speed, or data limitations for the network. In some implementations, the characteristics are limited by the network. In some implementations, the characteristics are limited by a provider of the network. In some examples, the characteristics are limited by restrictions associated with an e-SIM or e-SIM profile used by the first device to connect to the provider. While the first device is connected to a first network, the first device receives a request to transmit a media asset (e.g., still photo, live photo, video recording, etc.) to a second device. In some implementations, the first network includes limitations on the connection it provides. The first device generates a low-quality version of the media asset and transmits the low-quality version to the second device using the first network. In some embodiments, the file size of the low-quality version is less than the original version selected for transmission. After transmitting the low-quality version to the second device, the first device determines it is connected to a second network, and based at least in part on the determination, automatically transmits data to the second device. The data comprises information needed to convert the low-quality version on the second device to the original version. Reducing the quality of the sent media asset sent to the second device, based on characteristics of the connection with a network, may allow sharing of media assets that is otherwise not possible over networks having limitations. Automatically updating the low-quality media asset on the second device when the first device connects to a faster network, or the speed of the first network increases, may improve user experience by ensuring the original quality media asset is presented to the second device.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
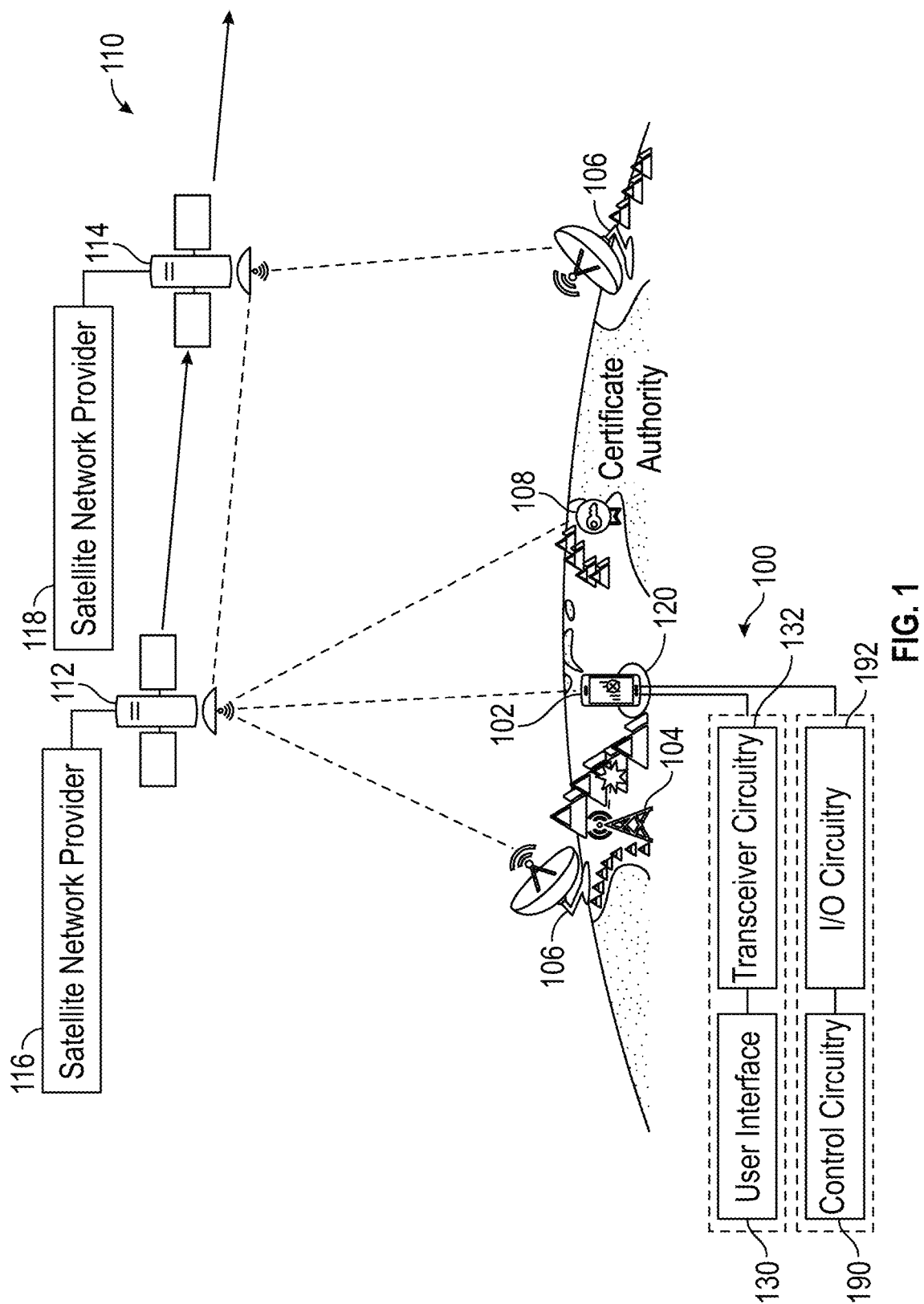
FIG. 1 is a schematic illustration of a system for provisioning a device to a satellite network provider without telecommunications service from a terrestrial network, in accordance with embodiments of the disclosure.

FIG. 1 is a schematic illustration of a system 100 for provisioning a device 102 to a satellite network provider (e.g., satellite network provider 116) without telecommunications service from a terrestrial network 104, in accordance with embodiments of the disclosure. In some embodiments, telecommunications service includes any of voice, messaging, data, or Internet services. The satellite network provider 116 operates on a satellite constellation 110 as a service provider or connectivity provider for the satellite constellation 110. The system 100 provisions the device 102 to the satellite network provider 116 through a satellite (e.g., first satellite 112) of the satellite constellation 110.

In some embodiments, the system 100 includes the device 102 (or, e.g., device 902, 1500 or user equipment 1607, 1608, 1610, discussed below in relation to FIGS. 9, 15, and 16) control circuitry 190 (or, e.g., control circuitry 1512, 1611, discussed below in relation to FIGS. 15 and 16), and input/output (I/O) circuitry 192 (or, e.g., I/O path 1516, 1612, discussed below in relation to FIGS. 15 and 16). The device 102 includes a user interface 130 (or, e.g., user interface 1168 or user input interface 1502, discussed below in relation to FIGS. 11 and 15) and transceiver circuitry 132 (or, e.g., communication network 1606, discussed below in relation to FIG. 16). In some embodiments, the control circuitry 190 initializes or executes the system 100. The I/O circuitry 192 receives input from and/or outputs to the at least one of the user interface 130 or transceiver circuitry 132.

In the embodiment depicted in FIG. 1, the device 102 comprises a cell phone, such as a smartphone. In some embodiments, the device comprises any device that uses service to connect with other devices or execute functions. In some implementations, the device 102 is mobile and can be moved to distinct locations. In some examples, the device 102 comprises a user device, such as a laptop, tablet, smartwatch, or a head-mounted display (e.g., augmented/virtual reality headset), to name a few examples. In other examples, the device 102 comprises a "connected car," such as a vehicle equipped with Internet access or configured to connect to the Internet. In some implementations, the device 102 is stationary and remains fixed in one location. In some examples, the device 102 comprises a desktop computer, television, smart appliance, smart doorbell, security system, or any other device that uses service and is not typically moved.

In some embodiments, the user interface 130 includes systems (e.g., display system 1504, discussed below in relation to FIG. 15) to accept input from a user (e.g., a user of the device 102 or user 1192, described below in relation to FIGS. 11 and 12). In the embodiment depicted in FIG. 1, the user interface includes a display screen (e.g., a touch screen display or display system 1504, discussed below in relation to FIG. 15) that is integral with the device 102. The user interface receives input commands or preferences or selection of options from the user. In some embodiments, the user interface includes a user device, such as user equipment 1607, 1608, 1610 discussed below in relation to FIG. 16. In one example, the user device runs an application to accept input from the user and to communicate with the control circuitry 190. The control circuitry 190 communicates with the user device through the I/O circuitry 192.

In some embodiments, the transceiver circuitry 132 comprises a transmitter and a receiver. In some implementations, the transceiver circuitry 132 includes a radio, amplifier, and antenna. In some implementations, the transceiver circuitry 132 includes any of an encoder, decoder, modulator, demodulator, upconverter, down converter, frequency filter, mixer, multiplexer, or waveform generator. The system 100 uses the transceiver circuitry 132 to create an uplink with, and transmit a signal to, a first satellite 112, which may amplify and/or change the frequency of the signal received from the transceiver circuitry 132. The system 100 uses the transceiver circuitry 132 to establish a downlink with the first satellite 112 and receive a signal transmitted back to Earth by the first satellite 112.

In some embodiments, the control circuitry 190 resides in or on the device 102. The system 100 includes several applications to control the device 102 based on inputs. For example, the control circuitry 190, by running the system 100, processes computer-executable instructions to analyze the input from a network status application and/or the user interface to determine the availability of and/or the status of communication networks (e.g., satellite constellation 110 or terrestrial network 104 in FIG. 1, SATCOM network 210 in FIGS. 2, 4, and 5, first or second network 784, 786 in FIG. 7, or communication network 1606, discussed below in relation to FIG. 16). In some implementations, the communication networks include any of a terrestrial network (e.g., the terrestrial network 104) or a satellite communication (SATCOM) network. In some implementations, the communication networks provide access to other devices or servers. In some examples, the other devices or servers are remote from the device 102, such as at least a minimum separation distance away from the device 102. In some examples, the minimum separation distance is at least 500 feet. In some examples, the minimum separation distance is at least 1 mile. In some examples, the minimum separation distance is at least 100 miles. In some implementations, the communication networks provide access to the Internet or to a network of other devices or servers. In some embodiments, the terrestrial network is a communication system that operates over land-based physical infrastructure. In some implementations, the terrestrial network includes wireless networks and/or wired networks. In some examples, the wireless networks include any of a cellular network or Wi-Fi network. Cellular networks may include any of the generations of wireless mobile telecommunications technologies (e.g., 3G, 4G, and 5G), such as universal mobile telecommunications system, long-term evolution, and 5G New Radio (NR), to name a few examples. In some examples, the wireless networks do not include any of offline, local, or direct connections to another device or server. In one example, the wireless networks do not include short-range wireless network connections to a single device (e.g., a Bluetooth or NFC connection to a nearby device) and/or connections to an insular group of "offline" devices (e.g., an intranet network). In some examples, the wired networks include any of a dial-up, digital subscriber line, cable, or fiber optic cord or cable connection to other devices or servers. In some examples, the wired networks do not include connections to "offline" devices.

In some examples, the applications are stored in a non-transitory memory (e.g., storage 1514, 1614, discussed below in relation to FIGS. 15 and 16). In some implementations, instructions for the applications are stored in the non-transitory memory, and when executed, perform the operations of a process for provisioning the device 102 to connect to the satellite network provider 116 (e.g., process 260, 560, 1300, discussed below in relation to FIGS. 2, 5, and 13) and/or a process for controlling the device 102 based on a profile used to connect to the satellite network provider 116 (e.g., process 660, 760, 1040, 1400, discussed below in relation to FIGS. 6, 7, 10, and 14). In some implementations, the control circuitry 190 includes processing circuitry (e.g., processing circuitry 1510, discussed below in relation to FIG. 15) to process input to the control circuitry 190 (e.g., data and computer-executable instructions), store data to the non-transitory memory, and output results. In some implementations, the system 100 includes a computer (e.g., user equipment 1607, discussed below in relation to FIG. 16) having the non-transitory memory with non-transitory instructions, that when executed, cause the execution of the applications. In one example, the control circuitry 190 and I/O circuitry 192 are part of the computer having the non-transitory memory. In some embodiments, the instructions are provided by the control circuitry 190 through the I/O circuitry 192.

A device provisioning application executes on the control circuitry 190, such as discussed below in relation to FIGS. 15 and 16, to provide instructions to the control circuitry 190 to perform the operations of the provisioning process. In some embodiments, the control circuitry 190 and/or the I/O circuitry 192 executes the device provisioning application to transmit information to, receive information from, and process information associated with communications with the satellite constellation 110 and/or the first satellite network provider 116. The control circuitry 190 also executes the network status application, such as discussed below in relation to FIGS. 15 and 16, to determine whether the device 102 is currently connected to a communication network or whether communication networks are accessible for connection. In some embodiments, the control circuitry 190 executes either of the network status application or the device provisioning application to determine whether the device 102 has previously connected to the satellite network provider 116.

The control circuitry 190 also executes a quality management application, such as discussed below in relation to FIGS. 15 and 16, to monitor network performance of the communication network. In some embodiments, the quality management application determines any of signal strength, packet loss, jitter, latency, throughput, bandwidth, or bandwidth utilization of the connection between the device 102 and communication network. In some implementations, the quality management application adjusts operations of the device 102 based on the network performance. The control circuitry 190 also executes a coverage prediction application, such as discussed below in relation to FIGS. 15 and 16, to predict when device 102 will experience degraded (e.g., limited or no) network coverage. In some embodiments, the coverage prediction application predicts when at least one of (i) available communication networks, (ii) available terrestrial networks, or (iii) a network to which the device is currently connected will be degraded. In some embodiments, the prediction is based on at least one of a current position, heading, trajectory, or speed of the device 102. In some embodiments, the prediction is based on at least one of available paths or roads, signal strength, coverage maps, or data from a user profile associated with, or used by, the device 102. In some embodiments, the control circuitry 190 communicates with a server and at least part of at least one of the applications runs on a server, such as discussed below in relation to FIG. 16. In some implementations, the instructions for the applications are stored on the server.

In some embodiments, the device 102 typically connects to a service provider through a terrestrial network 104. In some scenarios, the device 102 is located in a dead zone 120 with limited or no service from the terrestrial network 104. In some scenarios, signals from the terrestrial network 104 cannot reach the device 102. In some examples, the signals may not propagate far enough from a base station (e.g., a cell tower or wireless access point) or may be blocked or attenuated by terrain (e.g., a mountain), atmospheric conditions (e.g., fog, rain, snow and humidity), or an object (e.g., a building or structure). In such scenarios, when the device 102 has limited or no service from the terrestrial network 104, the system 100 is used to establish service through secure communications with the satellite constellation 110. For example, the system 100 may be used in combination with the methods and operations to provision the device 102 with a first satellite network provider 116 operating on a first satellite 112 of the satellite constellation 110.

The satellite constellation 110 includes the first satellite 112 and a second satellite 114. In some embodiments, the satellite constellation 110 is a distributed network. In some implementations, satellites (e.g., first and second satellites 112, 114) of the satellite constellation 110 communicate with one another to perform a process, such as any of provisioning devices (e.g., device 102), communicating with other entities, or maintaining, sharing, or distributing service. In some embodiments, the first and/or second satellites 112, 114 comprises control circuitry and I/O circuitry. In some embodiments, the first and second satellites 112, 114 are low earth orbit (LEO) satellites that move in relation to the Earth's surface and the device 102. In some implementations, the first and second satellites 112, 114 travel with the Earth's rotation. In some implementations, the first and/or second satellites 112, 114 travel against (e.g., in a direction opposite of) the Earth's rotation. In some implementations, the network provider(s) operating on the first and second satellites 112, 114 varies based on the position of the first and second satellites 112, 114.

In the embodiment depicted in FIG. 1, the first satellite 112 is positioned above a geographic location in a first country (e.g., United States) and the second satellite 114 is positioned above a geographic location in a second country (e.g., Spain). In some embodiments, the geographic locations are referred to as the corresponding geographic locations since they are at locations that are remote from, and correspond to, the first and second satellites 112, 114. A swath (or footprint) of the first and second satellites 112, 114 is the strip of the Earth's surface observed by each satellite's sensors, or a coverage area accessible by each satellite's transceivers, during each satellite's orbit. The swath of each of the first and second satellites 112, 114 covers an area that includes the corresponding geometric locations.

In the orbital positions shown in FIG. 1, the swath of the first satellite 112 covers at least a portion of the first country and the swath of the second satellite 114 covers at least a portion of the second country. The first satellite network provider 116 operates on the first satellite 112 and a second satellite network provider 118 is shown operating on the second satellite 114. In some embodiments, the first satellite network provider 116 is associated with the first country and the second satellite network provider 118 is associated with the second country. In some embodiments, the first satellite network provider 116 provides telecommunications services to devices 102 located in the first country and the second satellite network provider 118 provides telecommunications services to devices 102 located in the second country. In some embodiments, when the first satellite 112 is no longer positioned above the first country, or is out of a coverage area or service range for the first country, a different satellite network provider (e.g., second satellite network provider 118) operates on the first satellite 112. In some implementations, the first satellite network provider 116 does not operate on any satellites of the satellite constellation 110 that are positioned outside of the first country or satellites that are out of a coverage area or service range for the first country. In some implementations, the first and second satellite network providers 116, 118 both operate simultaneously on one of the first and second satellites 112, 114.

In some embodiments, each of the first and second satellites 112, 114 communicates with a ground station 106 or Earth station to connect to a terrestrial network. In some implementations, the terrestrial network associated with the ground station 106 provides service to the first satellite 112. In some implementations, the terrestrial network associated with the ground station 106 provides service to the satellite constellation 110. In some embodiments, the first satellite 112 communicates with the second satellite 114 to connect to a terrestrial network. In some embodiments, the second satellite 114 communicates with the first satellite 112 to connect to a terrestrial network.

In some embodiments, the first satellite 112 communicates with a certificate authority 108. The certificate authority is a trusted entity that issues digital certificates that are used to authenticate communications between other entities (e.g., device 102; first and second satellites 112, 114; and satellite network providers 116, 118), such as discussed below in relation to FIG. 2. In some implementations, the certificate authority is a software process or application that is executed (e.g., by control circuitry). In the embodiment depicted in FIG. 1, the certificate authority 108 resides on land-based equipment (e.g., server 1604, discussed below in relation to FIG. 16) located in the first country at a different location (e.g., a remote location) than the ground station 106 or device 102. In some embodiments, certificate authorities 108 are in multiple locations in the first and/or second countries. In some embodiments, the certificate authority 108 is part of a system that includes control circuitry and I/O circuitry. In some embodiments, the satellite constellation 110 comprises equipment on which the certificate authority 108 resides. In some implementations, the certificate authority 108 resides on the first and/or second satellite 112, 114. In some examples, the certificate authority 108 resides on equipment (e.g., control circuitry, I/O circuitry, non-transitory memory) that is physically separated from equipment (e.g., control circuitry, I/O circuitry, non-transitory memory) of the first and/or second satellite 112, 114 that used to provision the device 102. In some embodiments, at least a portion of the certificate authority and satellite provisioning equipment are shared and the certificate authority 108 is a software-isolated process. In some implementations, the first satellite 112 communicated with the certificate authority 108 to provision the device 102 through inter-process communication. In some implementations, the certificate authority 108 is distributed amongst a plurality of satellites (e.g., first and second satellites 112, 114) of the satellite constellation 110.

In some embodiments, the system 100 leverages the multiplexing capabilities of the QUIC protocol to enhance the transmission of e-SIM profile information between the device 102 and the satellite constellation 110. In some implementations, the system 100 utilizes QUIC's ability to handle multiple streams of data concurrently over a single connection, which may be advantageous for transmitting various types of e-SIM related information simultaneously without encountering head-of-line blocking issues. In some examples, separate streams are established within a single QUIC connection for different components or entities of the e-SIM provisioning process. For example, one stream may be dedicated to the transmission of the e-SIM, a second stream for service plan options or e-SIM profiles, a third stream for cryptographic key exchanges, and a fourth stream for user authentication data. By segregating these data types into distinct streams, the system 100 ensures that the delay or loss of packets in one stream does not impede the flow of data in others.

Figure 2:
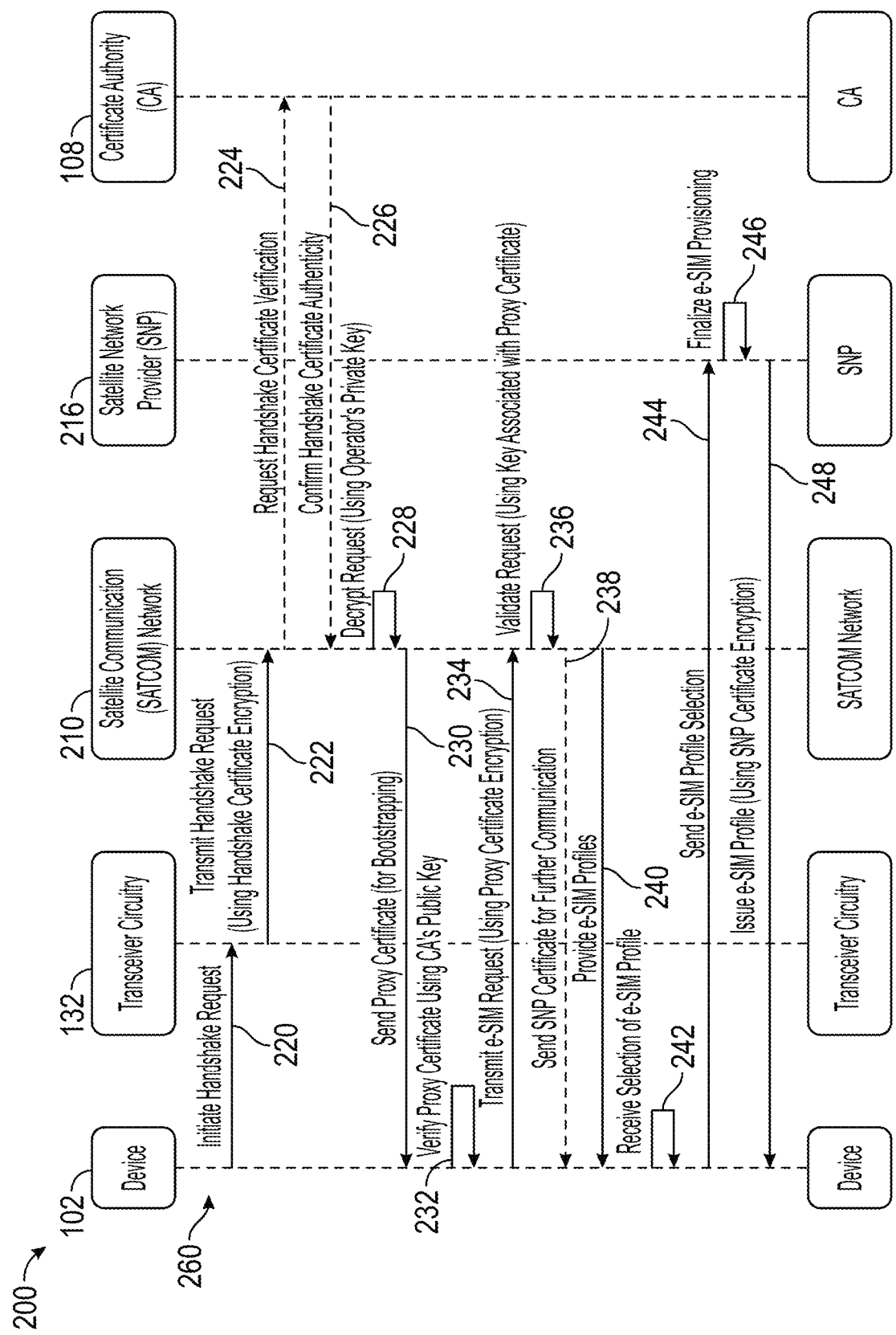
FIG. 2 is an example sequence diagram defining communication between a system for provisioning a device to a satellite network provider and provisioning entities, in accordance with embodiments of the disclosure.

FIG. 2 is an example sequence diagram 500 defining communication between a system (e.g., system 100 in FIG. 1 or system 572, discussed below in relation to FIG. 5) for provisioning a device (e.g., device 102) to a satellite network provider 216 (e.g., satellite network provider 116 in FIG. 1) and provisioning entities (e.g., SATCOM network 210 and certificate authority 108), in accordance with embodiments of the disclosure.

A process 260 depicted by the sequence diagram 200 includes a series of operations. The process 260 may be implemented, in whole or in part, by one or more systems or devices described herein. Reading from the top to the bottom of FIG. 2, in some embodiments, each operation is performed in response to the previous operation. Operations are repeated, duplicated, and/or omitted in some embodiments. Additional operations disclosed herein are included in some embodiments. Entities are shown at the top and bottom of the figure and connected by a dashed vertical line. Messages between the entities are depicted as horizontal arrows with the name of the message superimposed above the arrows. The arrows are shown with end points connecting to the entities.

The entities include the device 102, transceiver circuitry 132, SATCOM network 210 (e.g., satellite constellation 110 in FIG. 1), satellite network provider 216, and certificate authority 108. In some embodiments, the SATCOM network 210 and/or its satellites are maintained by an operator. In some embodiments, the operator is an entity that maintains service provided by the SATCOM network 210 and/or its satellites.

The process 260 includes the device 102 (or, e.g., I/O circuitry 192 in FIG. 1 or I/O path 1516, 1612, discussed below in relation to FIGS. 15 and 16) initiating 220 a handshake request to establish a connection with the SATCOM network 210. In some embodiments, the device 102 executes the network status application to determine whether a SATCOM network 210 is available. In some embodiments, the encrypted handshake request is transmitted in response to, or based at least in part on, determining the device 102 has lost connectivity to a terrestrial network (e.g., terrestrial network 104 in FIG. 1 or first or second network 784, 786 in FIG. 7 or communication network 1606, discussed below in relation to FIG. 16). The device 102 (or, e.g., control circuitry 190 in FIG. 1 or control circuitry 1512, 1611, discussed below in relation to FIGS. 15 and 16) encrypts the handshake request using information from a handshake certificate. In some embodiments, the device 102 includes, or is pre-loaded with, the handshake certificate. In some implementations, the handshake certificate contains any of a public key, name, or digital signature of the operator of the SATCOM network 210. In some implementations, the device 102 encrypts the handshake request using a public key of the operator of the SATCOM network 210. In some implementations, the handshake certificate contains any of a public key, name, or digital signature of a certificate authority (e.g., certificate authority 108 or another certificate authority). In some implementations, the device 102 encrypts the handshake request using a public key of the certificate authority. In some implementations, the certificate includes a public key of the SATCOM network 210 and is signed by a certificate authority. In some implementations, the handshake certificate contains any of a public key, name, or digital signature of a network provider (e.g., a provider of terrestrial network 104 or any of satellite network providers 116, 118 in FIG. 1).

In some implementations, the handshake certificate is stored in a non-transitory memory (e.g., storage 1514, 1614, discussed below in relation to FIGS. 15 and 16) of the device 102. In some implementations, the device 102 requests the handshake certificate from a certificate authority (e.g., certificate authority 108 or another certificate authority) that is known by the SATCOM network 210, such as a certificate authority that has a certificate pre-installed on, or accessible by, the SATCOM network 210. In some embodiments, the handshake certificate is pre-installed on the device 102. In some implementations, certificates pre-installed on the device 102 are restricted by the terrestrial network service provider. In some implementations, certificates pre-installed on the SATCOM network 210 are from or for the terrestrial network service provider.

The transceiver circuitry 132 (or, e.g., transceiver circuitry 1508, discussed below in relation to FIG. 15) transmits 222 the encrypted handshake request to the SATCOM network 210.

In some embodiments, the device 102 transmits any of information about its own identity information, information about its current carrier or service plan (e.g., with a provider for the terrestrial network 104) or profile, or its GPS location to the SATCOM network 210. In some implementations, the GPS location includes any of the current GPS location, the last known GPS location, or a history of GPS locations. In some examples, the history of GPS locations includes recent GPS locations, such as GPS locations from the last hour, such as from the last 30 minutes, such as from the last 15 minutes, such as from the last 5 minutes, such as from the last minute. In some implementations, the device 102 transmits this information in operation 222. In some implementations, the device 102 transmits this information separately from operation 222.

In some embodiments, the SATCOM network 210 requests 224 verification of the handshake certificate from a certificate authority 108. In some implementations, the certificate authority 108 verifies the handshake certificate by performing any of determining whether the handshake certificate is valid, was issued by a trusted certificate authority or entity, has not expired, or matches the expected identity of the entity the certificate represents (e.g., the certificate authority that issued the handshake certificate, a terrestrial network provider, or the SATCOM network 210). If the handshake certificate passes verification, the certificate authority 108 confirms 226 the authenticity of the handshake certificate (or verifies the certificate) to the SATCOM network 210.

The SATCOM network 210 (or, e.g., the operator of the SATCOM network 210) decrypts 228 the handshake request using a private key. In some implementations, the private key is the private key of the operator of the SATCOM network 210 and is uniquely paired with the public key of the operator. In some implementations, the certificate authority decrypts the handshake request.

In some embodiments, the SATCOM network 210 sends a notification of the handshake request to the satellite network provider 216. In some embodiments, the satellite network provider 216 sends an acknowledgement of the notification to the SATCOM network 210. In some embodiments, the SATCOM network 210 requests to act as a proxy for the satellite network provider 216 to communicate with the device 102 on behalf of the satellite network provider 216. In some embodiments, the satellite network provider 216 approves the request to the SATCOM network 210 and sends a proxy request to the certificate authority 108. In some implementations, the proxy request includes information needed to establish the proxy. In some embodiments, the satellite network provider 216 generates a new proxy public and private key pair, and sends the proxy public key to the certificate authority 108 to include in the proxy certificate. In some embodiments, the satellite network provider 216 sends the proxy private key to the proxy (e.g., SATCOM network 210). In some implementations, the proxy private key is sent using any of symmetric key encryption, hybrid encryption, or public key encryption using the proxy's public key, to name a few examples.

In some embodiments, the handshake request is encrypted using information from a certificate that was issued by a network provider (e.g., a provider of terrestrial network 104 or any of satellite network providers 116, 118 in FIG. 1) of a digital identity module, such as an e-SIM, that was previously installed on the device 102. In some implementations, the SATCOM network 210 requests verification of the certificate from either one of the network providers or a certificate authority associated with the network provider.

In some embodiments, the certificate authority 108 sends a proxy certificate to the satellite network provider 216. In some implementations, the certificate authority 108 signs the proxy certificate, such as with a private key of the certificate authority 108. In some embodiments, the satellite network provider 216 sends the proxy certificate to the SATCOM network 210.

The SATCOM network 210 sends 230 a proxy certificate to the device 102. In some embodiments, device 102 receives the proxy public key with the proxy certificate. In some implementations, the device 102 extracts the proxy public key from the proxy certificate. In some embodiments, the device 102 uses the proxy certificate to bootstrap communication with the satellite network provider 216. The device 102 verifies 232 the proxy certificate using a public key of the certificate authority 108. In some embodiments, the public key of the certificate authority 108 is paired with the private key that the certificate authority 108 used to sign the proxy certificate. In some embodiments, the device 102 verifies the digital signature of the proxy certificate using the public key of the certificate authority 108. In some embodiments, the device 102 uses the digital signature of the certificate authority 108 to verify the proxy public key is that of the satellite network provider 216 and has not been tampered with. In some embodiments, SATCOM network 210 sends a SATCOM network certificate to establish communication with the device 102.

The device 102 transmits 234 a request for an e-SIM profile to the SATCOM network 210. In some embodiments, the request is to access the SATCOM network 210 through the satellite network provider 216. In some embodiments, the e-SIM profile request is encrypted using information from the proxy certificate. In some implementations, the proxy public key is used to encrypt the request.

The SATCOM network 210 validates 236 the request using a key associated with the proxy certificate. In some embodiments, the SATCOM network 210 uses the proxy private key to decrypt the request.

In some embodiments, the device 102 or control circuitry executes the device provisioning application to perform at least one of the operations of process 260.

In some embodiments, the SATCOM network 210 sends 238 a certificate of the satellite network provider 216 to the device 102. The SATCOM network 210 provides 240 at least one e-SIM profile to the device 102. In some embodiments, the SATCOM network 210 provides a plurality of e-SIM profiles. In some embodiments, an e-SIM profile contains information about service provided by the satellite network provider 216. In some implementations, an e-SIM profile contains any of a name of the satellite network provider, cost, data plan (e.g., data limits, bandwidths, or data speeds), time-of-day restrictions, location-based restrictions, or data-type restrictions (e.g., restrictions on any of calls, messages, streaming of media assets, or downloading) for the service, or any combination thereof. In some embodiments, the SATCOM network 210 communicates with the satellite network provider 216 to determine available options for e-SIM profiles provided by the satellite network provider 216. In some examples, each e-SIM profile offered by the satellite network provider 216 has any of a different data plan, data-type restriction, or cost.

In some embodiments, at least one e-STM profile is encrypted using the certificate of the satellite network provider 216. In some implementations, the device 102 decrypts the received e-SIM profiles using information from the certificate of the satellite network provider 216. In some implementations, the e-STM profiles are decrypted using a public key of the satellite network provider 216.

In some embodiments, any of the satellite network provider 216, SATCOM network 210, device 102, or control circuitry filters the e-SIM profiles. In some implementations, any of the satellite network provider 216 or SATCOM network 210 filters the e-STM profiles to result in a subset of e-SIM profiles that match or fall within a range of frequencies in which the device 102 (or, e.g., the transceiver circuitry 132 in FIG. 1) is capable of communicating. In some implementations, the subset of e-STM profiles match or fall within a range of frequencies of a network provider (e.g., a provider of terrestrial network 104) to which the device 102 has previously connected. In some embodiments, the satellite network provider 216 is restricted to a range of frequencies based on a licensing agreement. In some implementations, the licensing agreement is with a country. In some examples, the range of frequencies on which the satellite network provider 216 operates varies by country.

In some embodiments, the SATCOM network 210, or operator thereof, hands off communication with the device 102 to the satellite network provider 216. In some implementations, the hand off is any of in response to, based at least in part on, or after operation 236. In some implementations, the satellite network provider 216 performs any of operations 238 or 240.

In some embodiments, the SATCOM network 210 is a proxy for a plurality of satellite network providers (e.g., satellite network providers 116, 118 or 216 in FIGS. 1 and 2). In some implementations, the SATCOM network 210 provides e-SIM profiles to the device 102 for at least a portion of the satellite network providers.

The device 102 receives 242 a selection of an e-SIM profile. In some embodiments, the device 102 receives the selection from a user interface (e.g., user interface 130 in FIG. 1 or user interface 1168 or user input interface 1502, discussed below in relation to FIGS. 11 and 15) of the device 102. In some embodiments, the device 102 receives the selection from control circuitry (e.g., control circuitry 190 in FIG. 1 or control circuitry 1512, 1611, discussed below in relation to FIGS. 15 and 16). In some implementations, the selection is based at least in part on data from a user profile, such as user preferences or prior selections. In some implementations, the selection is based at least in part on the control circuitry determining the device 102 has previously used one of the e-SIM profiles. In some examples, the control circuitry determines one of the e-SIMs is installed on the device 102. In some embodiments, either of operations 238 or 240 are not performed. In some embodiments, the selected e-SIM profile requires the device 102 to change the range of frequencies on which it operates.

The device 102 sends 244 the selection of the e-SIM profile to the satellite network provider 216. In some embodiments, the device 102 sends payment information for the selected e-STM profile. In some embodiments, any one of the e-STM profile selection or the payment information is encrypted using information from the certificate of the satellite network provider 216. In some embodiments, the satellite network provider 216 accesses payment information linked to the device 102 (e.g., through a non-transitory memory of the system or by accessing a separate system, such as a land-based server). In some implementations, the payment information is stored in or linked to a user profile associated with, or used by, the device 102. In some implementations, the device 102 does not send payment information.

The satellite network provider 216 finalizes 246 provisioning of the e-STM for the selected e-SIM profile. In some embodiments, the satellite network provider 216 processes the payment information linked to the device 102.

The satellite network provider 216 issues 248 the e-SIM to the device 102. In some embodiments, the satellite network provider 216 sends a configuration that corresponds to the selected e-SIM profile to the device 102. In some embodiments, the e-SIM is encrypted using information from the certificate of the satellite network provider 216. In some implementations, the private key of the satellite network provider 216 is used to encrypt the e-SIM. In some implementations, the device 102 decrypts the received e-SIM using information from the certificate of satellite network provider 216. In some examples, the device 102 uses the corresponding public key of satellite network provider 216 to decrypt the received e-SIM.

In some embodiments, any of the SATCOM network 210 or the satellite network provider 216 comprises a certificate authority (e.g., certificate authority 108).

In some embodiments, at least one of the communications between the entities (e.g., device 102, SATCOM network 210, satellite network provider 216, or certificate authority 108) is encrypted using asymmetric cryptography. In some embodiments, at least one of the communications between the entities is encrypted using hybrid cryptography. In some implementations, the SATCOM network 210 or satellite network provider 216 generates a pair of symmetric keys (sometimes referred to as session keys), encapsulates one of the symmetric keys with a public key of the device 102, and sends the encapsulated symmetric key to the device 102 (e.g., in operation 230, operation 240, or a separate operation). The device 102 decapsulates the symmetric key using a corresponding private key of the device 102. The SATCOM network 210 or satellite network provider 216 and the device 102 each use their symmetric key to encrypt messages sent and decrypt messages received.

Figure 3B:
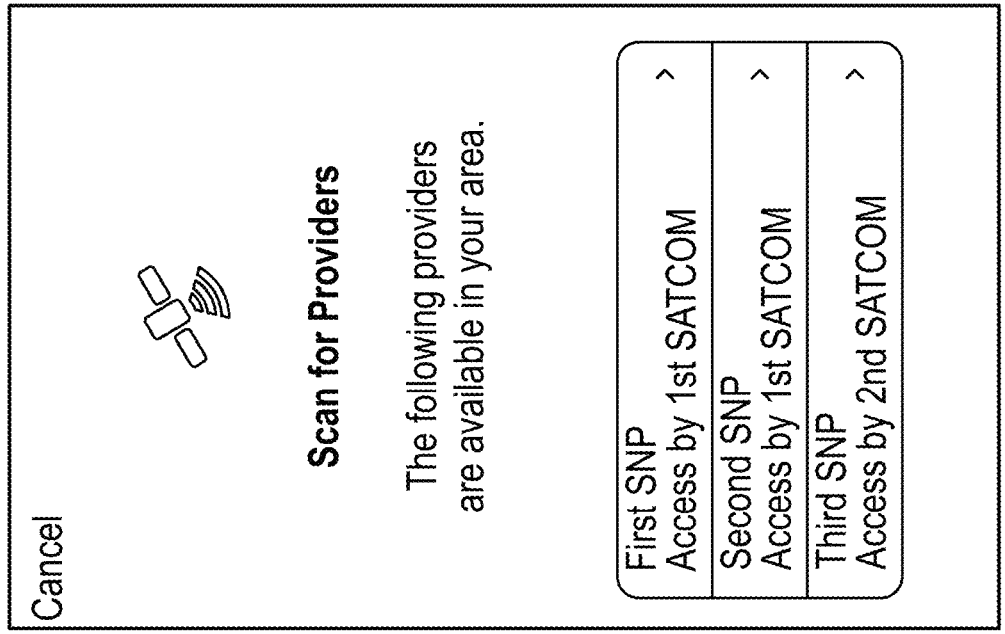
FIGS. 3A and 3B are representations of different graphical user interfaces of a device attempting to connect to a satellite network provider, in accordance with embodiments of the disclosure.
Figure 3A:
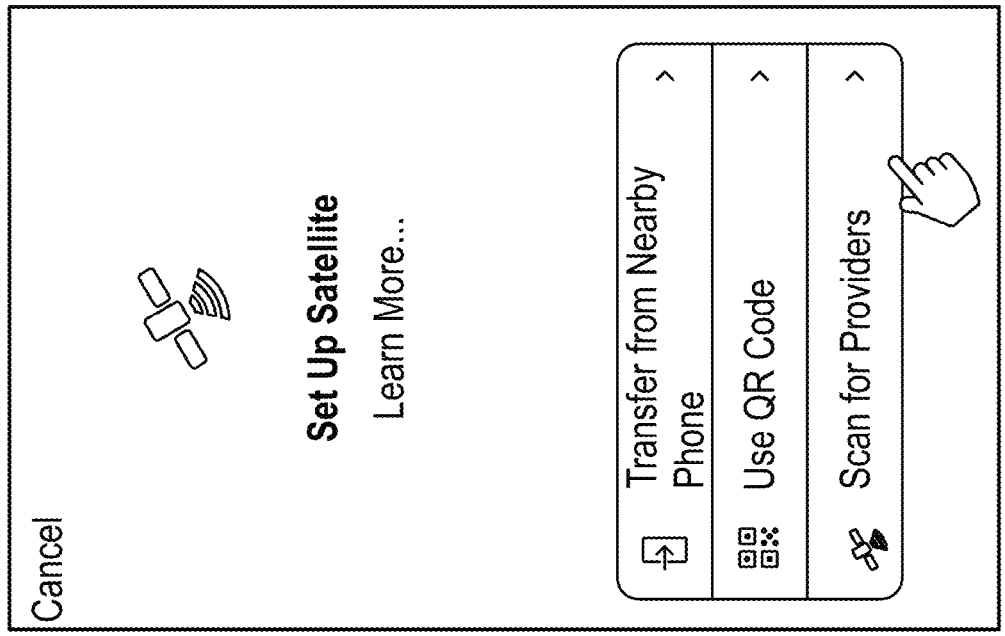

FIGS. 3A and 3B are representations of different graphical user interfaces (GUIs) of a device (e.g., device 102 in FIGS. 1, 2, and 11 or device 902, 1500 or user equipment 1607, 1608, 1610, discussed below in relation to FIGS. 9, 15, and 16) attempting to connect to a satellite network provider (e.g., satellite network providers 116, 118 or 216 in FIGS. 1 and 2), in accordance with embodiments of the disclosure. In some embodiments, the GUIs are generated for display, by control circuitry (e.g., control circuitry 190 in FIG. 1 or control circuitry 1512, 1611, discussed below in relation to FIGS. 15 and 16), on the device 102. In some embodiments, the GUIs are presented on a display (e.g., user interface 130 in FIG. 1 or user interface 1168 or user input interface 1502, discussed below in relation to FIGS. 11 and 15).

Referring to FIG. 3A, the top half of the GUI displays an icon of a satellite, text reading "set up satellite," and a clickable link to learn more about the provisioning process. The bottom half of the GUI displays three selectable options to provision the device to a satellite network provider. One option is to transfer provisioning information from a nearby phone. In some embodiments, any of Bluetooth, Wi-Fi, or near-field communication (NFC) is used to communicate with the nearby phone. Another option is to use a QR code. In some embodiments, the QR code is presented to a camera of the device. In some embodiments, the QR code is within an image or video saved on the device. The QR code contains of links to information needed to provision the device. Another option is to scan for satellite network providers. In some embodiments, selecting this option transmits a handshake request to a SATCOM network (e.g., SATCOM network 210 in FIG. 2) to query for e-SIM profiles from available satellite network providers, such as discussed in relation to FIG. 2. In the embodiment depicted in FIG. 3A, a pointer is shown selecting the option to scan for providers.

Referring to FIG. 3B, the top half of the GUI displays information that the satellite network providers displayed in the bottom half of the GUI are available as service providers for the device. Three selectable satellite network providers and their corresponding SATCOM network (or, e.g., operators of the SATCOM networks) are displayed in the bottom half. Access to a first satellite network provider and a second satellite network provider is provided by a first SATCOM network. Access to a third satellite provider is provided by a second SATCOM network. In some embodiments, the three satellite providers are the service providers available based on any of location of the device, agreements with a service provider, parameters set by the device manufacturer, or a service provider of the primary e-SIM in the device.

In some embodiments, the GUI in FIG. 3B is at least one of displayed in response to, based at least in part on, or after selection of the option to scan for providers on the GUI in FIG. 3A.

Figure 4:
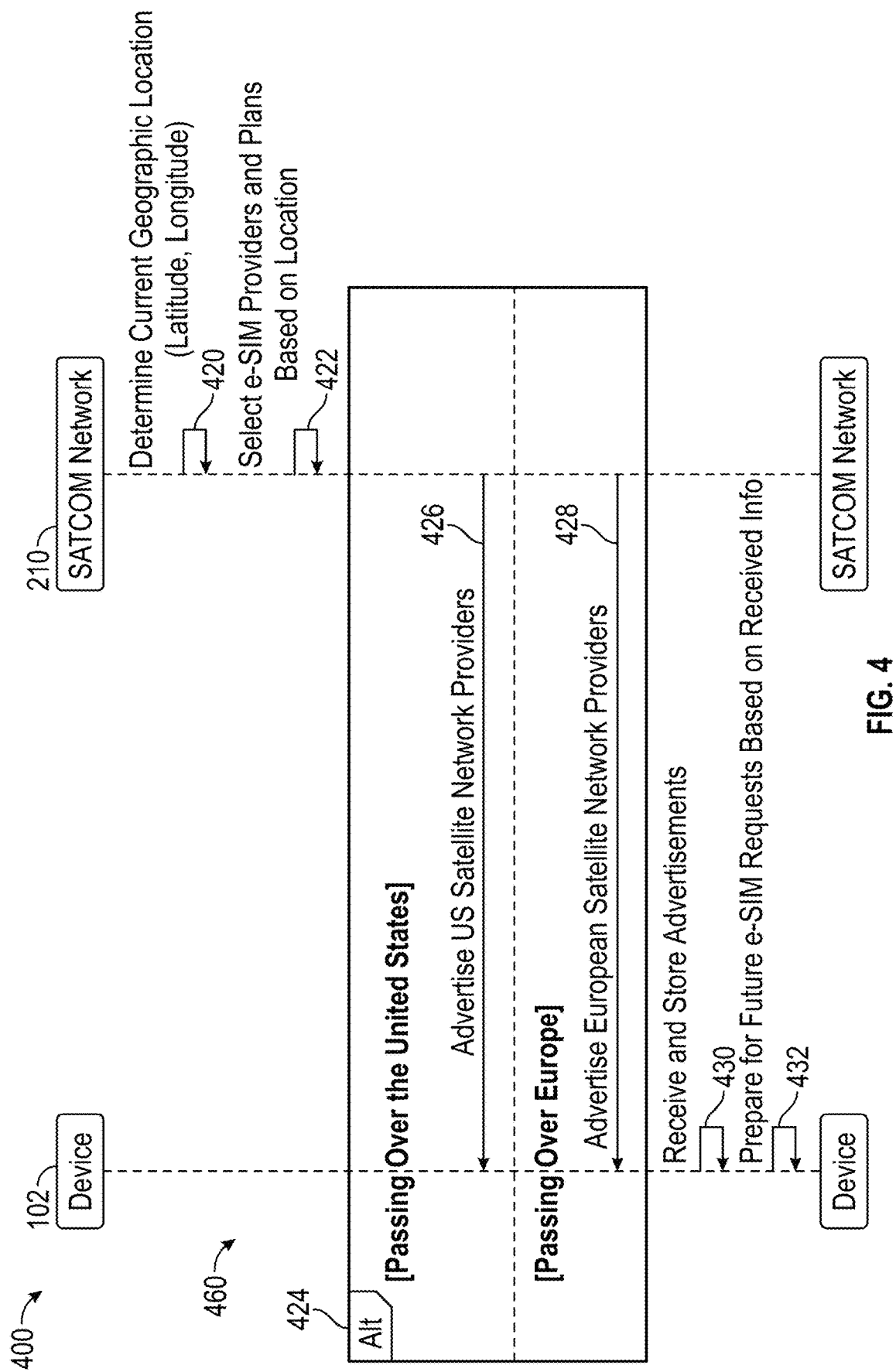
FIG. 4 is an example sequence diagram defining communication between a system for provisioning a device to a satellite network provider and a satellite based on the location of the satellite, in accordance with embodiments of the disclosure.

FIG. 4 is an example sequence diagram 400 defining communication between a system (e.g., system 100 in FIG. 1 or system 572, discussed below in relation to FIG. 5) for provisioning a device (e.g., device 102) to a satellite network provider and a satellite based on the location of the satellite, in accordance with embodiments of the disclosure.

The sequence diagram 400 depicts messages between entities during a process 460. The process 460 may be implemented, in whole or in part, by one or more systems or devices described herein. The entities include the device 102 and SATCOM network 210. Boxes that are labeled "alt" are drawn around the messages of operations that may be conditional. In one example, execution of the operations in the alt boxes are based on whether a condition is satisfied.

The process 460 includes the SATCOM network 210 determining 420 the current geographic location on Earth over which a satellite (e.g., first satellite 112 or second satellite 114 in FIG. 1) of the SATCOM network 210 is passing. In some embodiments, the geographic location is referred to as the corresponding geographic location since it is a terrestrial location that is remote from, and corresponds to, the celestial satellite. In some embodiments, the SATCOM network 210 determines locations within a coverage area of the satellite at a particular time. In some embodiments, the corresponding geographic location is a tangential point on Earth's surface that is determined using an imaginary line extending at 90 degrees from the Earth (e.g., from the Earth's center or surface) to the satellite. In some embodiments, the corresponding geographic location is the location of a device (e.g., device 102 in FIGS. 1, 2, and 11, or device 902, 1500 or user equipment 1607, 1608, 1610 discussed below in relation to FIGS. 9, 15, and 16) that is communicating with the satellite. In some implementations, the device location includes two-dimensional (2D) coordinates (e.g., latitude and longitude) or three-dimensional (3D) coordinates (e.g., in relation to a center or centroid of Earth or in relation to the satellite).

In some embodiments, the SATCOM network 210 determines locations within a coverage area of the satellite. In some implementations, the locations are determined at a particular time (e.g., present time or other time). In some implementations, the satellite communicates with multiple devices and the locations include the location of each device.

The SATCOM network 210 selects 422 satellite network providers (e.g., satellite network providers 116, 118 or 216 in FIGS. 1 and 2) for the satellite and e-SIM profiles based on the corresponding geographic location. In some embodiments, the SATCOM network 210 selects satellite network providers for the satellite based on the coverage area of the satellite.

The operations 426, 428 in alt box 424 are based on what country the satellite is passing over. In some embodiments, the operations 426, 428 in alt box 424 are based on what country the corresponding geographic location is located. In some embodiments, the operations 426, 428 in alt box 424 are based on the swath or coverage area of the satellite. If the satellite is passing over the United States (US), the SATCOM network 210 advertises 426 US satellite network providers. If the satellite is passing over Europe, the SATCOM network 210 advertises 428 European satellite network providers.

In some embodiments, the coverage area includes at least two countries, and each country is serviced by a different satellite network provider. In some implementations, the satellite advertises satellite network providers based on in what country the device is located. In some examples, a swath or coverage area of the satellite includes a first country serviced by a first satellite network provider and a second country serviced by a second satellite network provider. In one example, the satellite simultaneously advertises the first satellite network provider to devices located in the first country and the second satellite network provider to devices located in the second country.

The device receives 430 and stores the advertised satellite network providers. In some embodiments, the advertised satellite network providers and their corresponding geographic locations or coverage areas are stored in a non-transitory memory (e.g., storage 1514, 1614, discussed below in relation to FIGS. 15 and 16) of the device 102. The device 102 prepares 432 for future e-SIM requests based on information in the received or stored advertisements. In some embodiments, the information in the advertisements is received without the device 102 connecting to or provisioning to the satellite network provider. In some embodiments, storing the information allows the device 102 to access information related to future e-SIM requests in a passive way. In some implementations, the stored information shortens the operations required in the provisioning process (e.g., process 260 in FIG. 2). In some embodiments, the information includes e-SIM profiles or any of the information in an e-SIM profile, as discussed above in relation to FIG. 2.

In some embodiments, the device 102 or control circuitry executes the device provisioning application to perform at least one of the operations of process 460.

Figure 5:
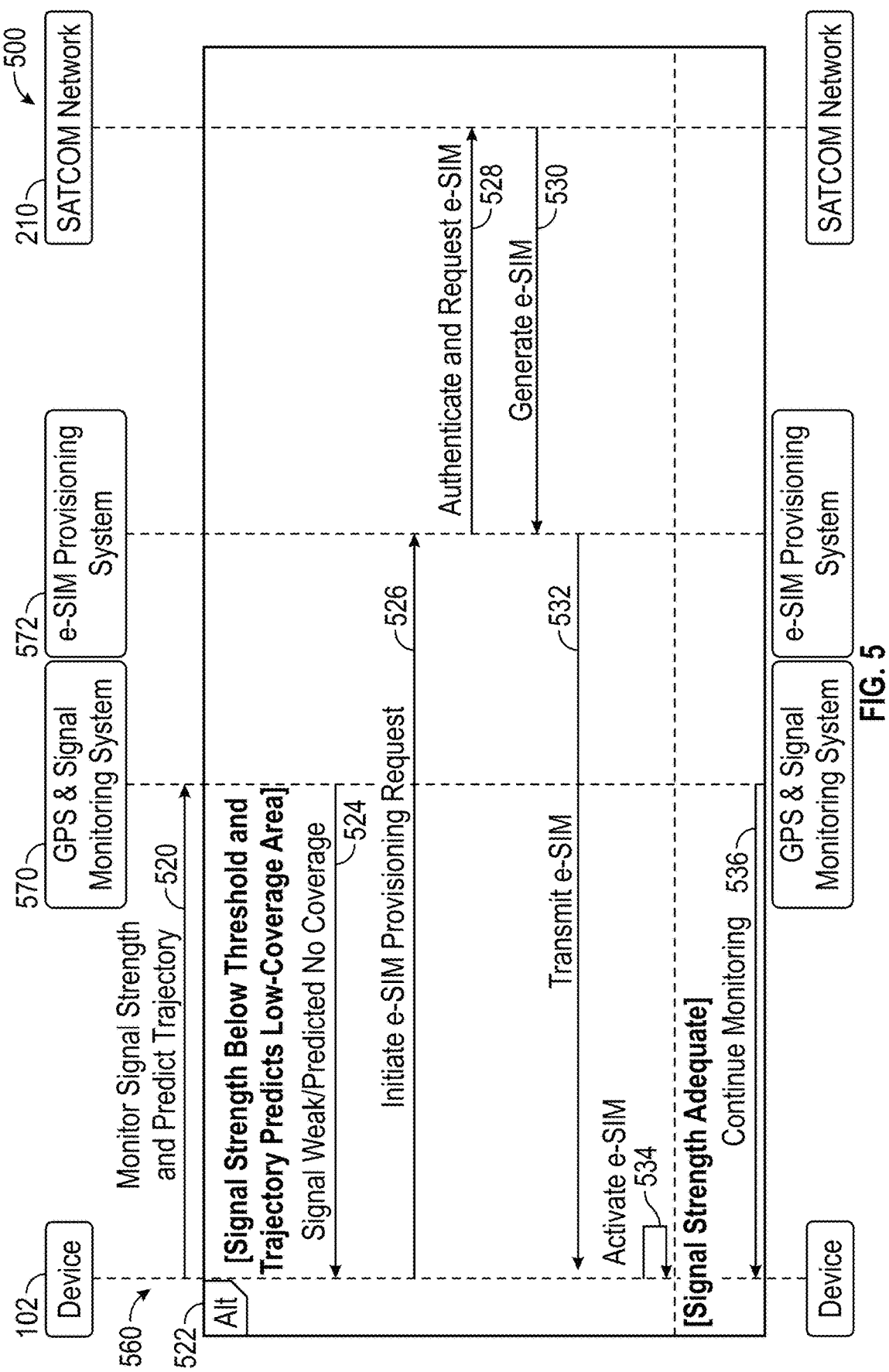
FIG. 5 is an example sequence diagram defining communication between a system for provisioning a device to a satellite network provider and provisioning entities, in accordance with embodiments of the disclosure.

FIG. 5 is an example sequence diagram 500 defining communication between a system (e.g., system 572) for provisioning a device (e.g., device 102) to a satellite network provider (e.g., satellite network providers 116, 118 or 216 in FIGS. 1 and 2) and provisioning entities, in accordance with embodiments of the disclosure.

The sequence diagram 500 depicts messages between entities during a process 560. The process 560 may be implemented, in whole or in part, by one or more systems or devices described herein. The entities include the device 102, a GPS and signal monitoring system 570, an e-SIM provisioning system 572, and the SATCOM network 210.

The process 560 includes the GPS and signal monitoring system 570 monitoring 520 a signal strength (e.g., by executing the quality management application) and predicting a trajectory (e.g., by executing the coverage prediction application) of the device 102. In some embodiments, the GPS and signal monitoring system 570 comprises control circuitry (e.g., control circuitry 190 in FIG. 1 or control circuitry 1512, 1611, discussed below in relation to FIGS. 15 and 16). In some embodiments, the GPS and signal monitoring system 570 comprises separate entities or circuitry for GPS monitoring and for signal monitoring. In some implementations, the GPS monitoring entity, the signal monitoring entity, and the device 102 communicate independently with each other. In some embodiments, the device 102 is connected to a terrestrial network (e.g., terrestrial network 104 in FIG. 1; first or second network 784, 786 in FIG. 7; or communication network 1606, discussed below in relation to FIG. 16) and the signal strength is in relation to the connection with the terrestrial network.

In some embodiments, any of the device 102 or GPS and signal monitoring system 570 continuously monitors the signal strength. In some embodiments, any of the device 102 or GPS and signal monitoring system 570 continuously monitors the location of the device 102. In some implementations, the location of the device 102 is determined by any of GPS, Wi-Fi or cell tower triangulation, Bluetooth beacons, internet protocol (IP)-based location, or any combination of such. In some implementations, the device 102 stores its location in a non-transitory memory (e.g., storage 1514, 1614, discussed below in relation to FIGS. 15 and 16) to generate historical movement data for the device 102.

The operations 524-536 in alt box 522 are based on the signal strength and trajectory prediction of the device 102. If the signal strength is below a signal strength threshold and the trajectory predicts the device 102 will enter a low-coverage area, the GPS and signal monitoring system 570 informs the device 102 of the weak signal and predicted degradation of coverage. In some embodiments, the signal strength threshold is a signal strength at which packets are reliably delivered. In some implementations, the signal strength threshold is −67 dBm or less, such as −70 dBm or less, such as −80 dBm or less, such as −85 dBm or less, such as −100 dBm or less. In some implementations, the GPS and signal monitoring system 570 informs the device 102 of the weak signal and if the signal strength is below the signal strength threshold for a minimum signal time threshold, such as at least 30 seconds, such as at least 1 minute, such as at least 3 minutes, such as at least 5 minutes. In some implementations, the GPS and signal monitoring system 570 informs the device 102 of the weak signal and if the average of the signal strength is below the signal strength threshold for the minimum signal time threshold.

In some embodiments, any of the device 102 or GPS and signal monitoring system 570 use GPS and/or historical movement data of the device 102 to predict the trajectory of the device 102 and estimate the likelihood of entering an area without service. In some embodiments, any of a coverage maps for service providers, patterns in the historical movement data (e.g., based on time of day, day or week, current or last known location, or other data contained in a user profile), maps of roads, routes, or paths, or terrain data are used to predict the trajectory of the device 102. In one example, the device 102 is traveling along a road having a known course. The device 102 or GPS and signal monitoring system 570 compares a coverage map for the current service provider with the known course. If the known course travels through an area having no coverage on the coverage map, the GPS and signal monitoring system 570 signals the device 102 that the trajectory predicts the device 102 will enter a low-coverage area. In some examples, a predicted course is used based on available roads and data indicative of a destination. In some embodiments, approaches other than GPS are used to determine the location.

The device 102 initiates 526 an e-SIM provisioning request (e.g., by executing the device provisioning application) with the e-SIM provisioning system 572 (or, e.g., system 100 in FIG. 1). In some embodiments, the e-SIM provisioning system 572 comprises transceiver circuitry (e.g., transceiver circuitry 132 in FIGS. 1 and 2 or transceiver circuitry 1508, discussed below in relation to FIG. 15). In some embodiments, the e-SIM provisioning system 572 comprises control circuitry (e.g., control circuitry 190 in FIG. 1 or control circuitry 1512, 1611, discussed below in relation to FIGS. 15 and 16). In some embodiments, the system 100 discussed in relation to FIG. 1 is or comprises the e-SIM provisioning system 572. In some implementations, the e-SIM provisioning system 572 comprises the device 102 and the GPS and signal monitoring system 570. In some embodiments, any of the operations 524 or 526 automatically happen when the signal strength is below a signal strength threshold and/or the trajectory predicts the device 102 will enter a low-coverage area.

The e-SIM provisioning system 572 requests 528 an e-SIM profile from the SATCOM network 210. In some embodiments, the e-SIM provisioning system 572 authenticates the provisioning request. In some embodiments, the SATCOM network 210 authenticates the provisioning request. The SATCOM network 210 generates 530 and sends an e-SIM, or a configuration that corresponds to the e-SIM profile, to the e-SIM provisioning system 572. The e-SIM provisioning system 572 transmits 532 the e-SIM to the device 102. The device 102 activates 534 the e-SIM. In some embodiments, the device 102 installs the e-SIM, using the received configuration that corresponds to the e-SIM profile, to access the SATCOM network 210.

In some embodiments, any of the operations 524-534 are replaced with or supplemented by the operations of process 260 discussed in relation to FIG. 2.

If the signal strength is adequate, the GPS and signal monitoring system 570 continues 536 to monitor the signal strength of the device 102.

In some embodiments, the device 102 determines more than one SATCOM network 210 or satellite network provider is available along the predicted the trajectory of the device 102.

In some implementations, the device 102 determines which SATCOM network 210 or satellite network provider to use. In some examples, the device 102 chooses an optimal SATCOM network 210 or satellite network provider based on any of a coverage area, signal strength, cost to access and use, connection speed or bandwidth, or data restrictions, to name a few examples. In some examples, the SATCOM network 210 generates and sends an e-SIM, or a configuration that corresponds to the e-SIM profile, that is for the optimal SATCOM network 210 or satellite network provider. In some implementations, the device 102 determines to use more than one SATCOM network 210 or satellite network provider before traveling, or while traveling, along the predicted the trajectory. In some examples, the device 102 automatically provisions to each of the more than one SATCOM network 210 or satellite network provider.

In some embodiments, the device 102 is connected to a first terrestrial network in operation 520 and the operations 528, 530 are performed with respect to a second terrestrial network instead of the SATCOM network 210, such as discussed below in relation to FIG. 7. In some embodiments, the device 102 is connected to a first SATCOM network in operation 520 and the SATCOM network 210 is a second SATCOM network.

Figure 6:
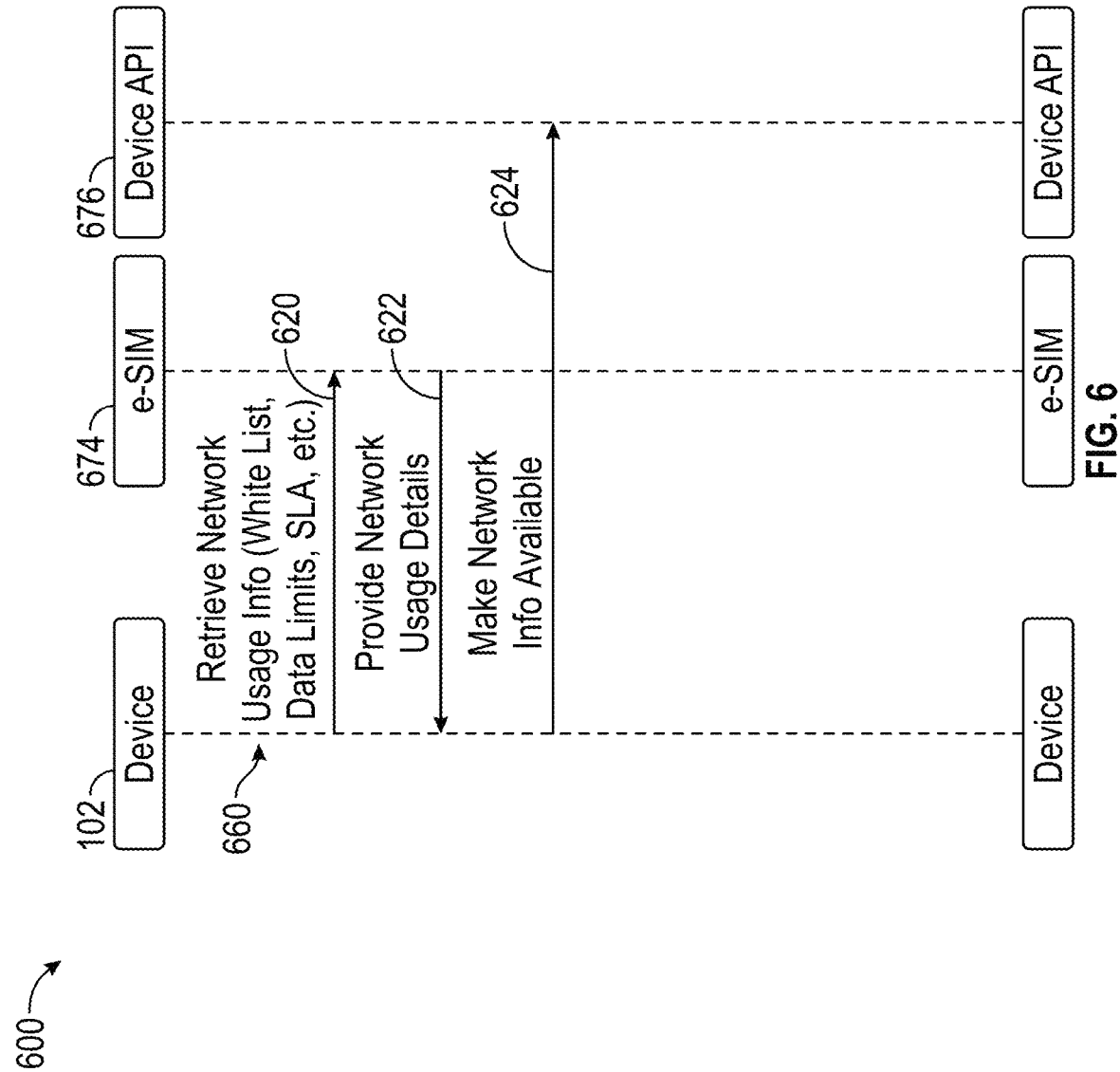
FIG. 6 is an example sequence diagram defining communication between components and applications of a system for provisioning a device to a satellite network provider to adjust operations of the applications based on an e-SIM profile, in accordance with embodiments of the disclosure.
Figure 6:
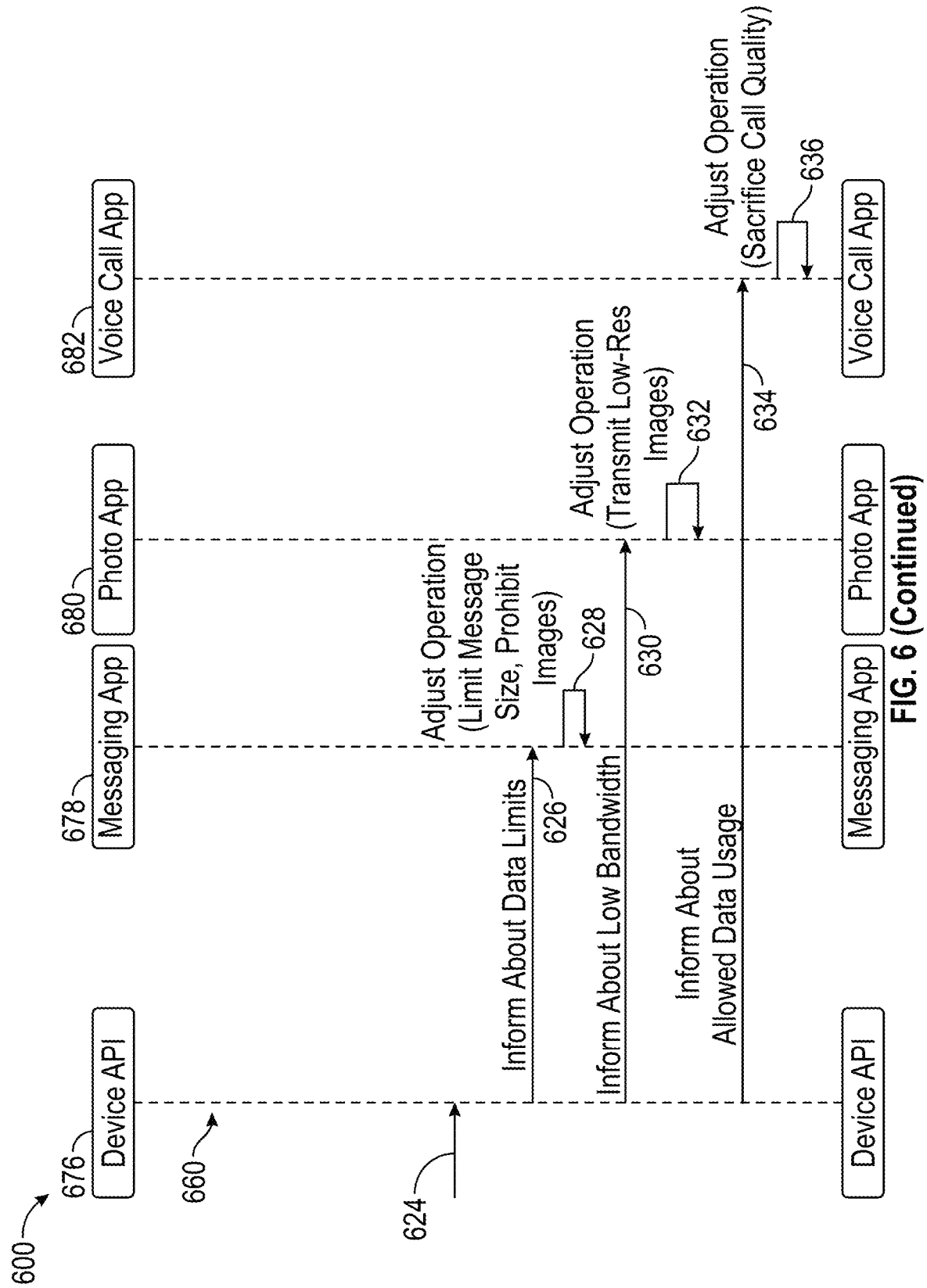

FIG. 6 is an example sequence diagram 600 defining communication between components and applications of a system (e.g., system 100, 572 in FIGS. 1 and 5) for provisioning a device (e.g., device 102) to a satellite network provider (e.g., satellite network providers 116, 118 or 216 in FIGS. 1 and 2) to adjust operations of the applications based on an e-STM profile, in accordance with embodiments of the disclosure.

The sequence diagram 600 depicts messages between entities during a process 660. The process 660 may be implemented, in whole or in part, by one or more systems or devices described herein. The entities include the device 102, an e-SIM 674 (or, e.g., a configuration that corresponds to an e-SIM profile), a device application programming interface (API) 676, a messaging application 678, a photo application 680, and a voice call application 682. In some embodiments, any of the messaging application 678, photo application 680, or voice call application 682 run on the device 102. In some implementations, control circuitry (e.g., control circuitry 190 in FIG. 1 or control circuitry 1512, 1611, discussed below in relation to FIGS. 15 and 16) executes or adjusts any of the messaging application 678, photo application 680, or voice call application 682. In some implementations, the device 102 or control circuitry executes the quality management application to adjust operations of any of the messaging application 678, photo application 680, or voice call application 682. In some embodiments, any of the messaging application 678, photo application 680, or voice call application 682 are third-party applications, which may be created by a different party than the network status application, device provisioning application, coverage prediction application, and quality management application.

The process 660 includes the device 102 retrieving 620 network usage information from the e-SIM 674. In some embodiments, the network usage information contained within the e-SIM 674 may relate to allowed applications (e.g., a whitelist of applications), allowed data usage information (e.g., a limitation on broadband or data speeds), data type and size information, service level agreement information, and other types of networking information related to operating within a bandwidth and/or data constrained network. In some embodiments, the network usage information is outlined by a SIM or e-SIM profile. The e-SIM 674 provides 622 network usage details to the device 102.

The device 102 makes 624 the network usage details available to applications installed on the device via the device API 676. The device API 676 informs 626 the messaging application 678 about data limits. The messaging application 678 adjusts 628 its operation. In some embodiments, the messaging application 678 limits message size (e.g., by limiting characters of a message, content of a message) and/or prohibits sending images in messages. The device 102 informs 630 the photo application 680 about bandwidth limitations (e.g., low bandwidth). The photo application 680 adjusts 632 its operation. In some embodiments, the photo application 680 transmits low resolution images. The device 102 informs 634 the voice call application 682 about allowed data usage. The voice call application 682 adjusts 636 its operation. In some embodiments, the voice call application 682 reduces call quality (e.g., reduces bitrate).

Figure 7:
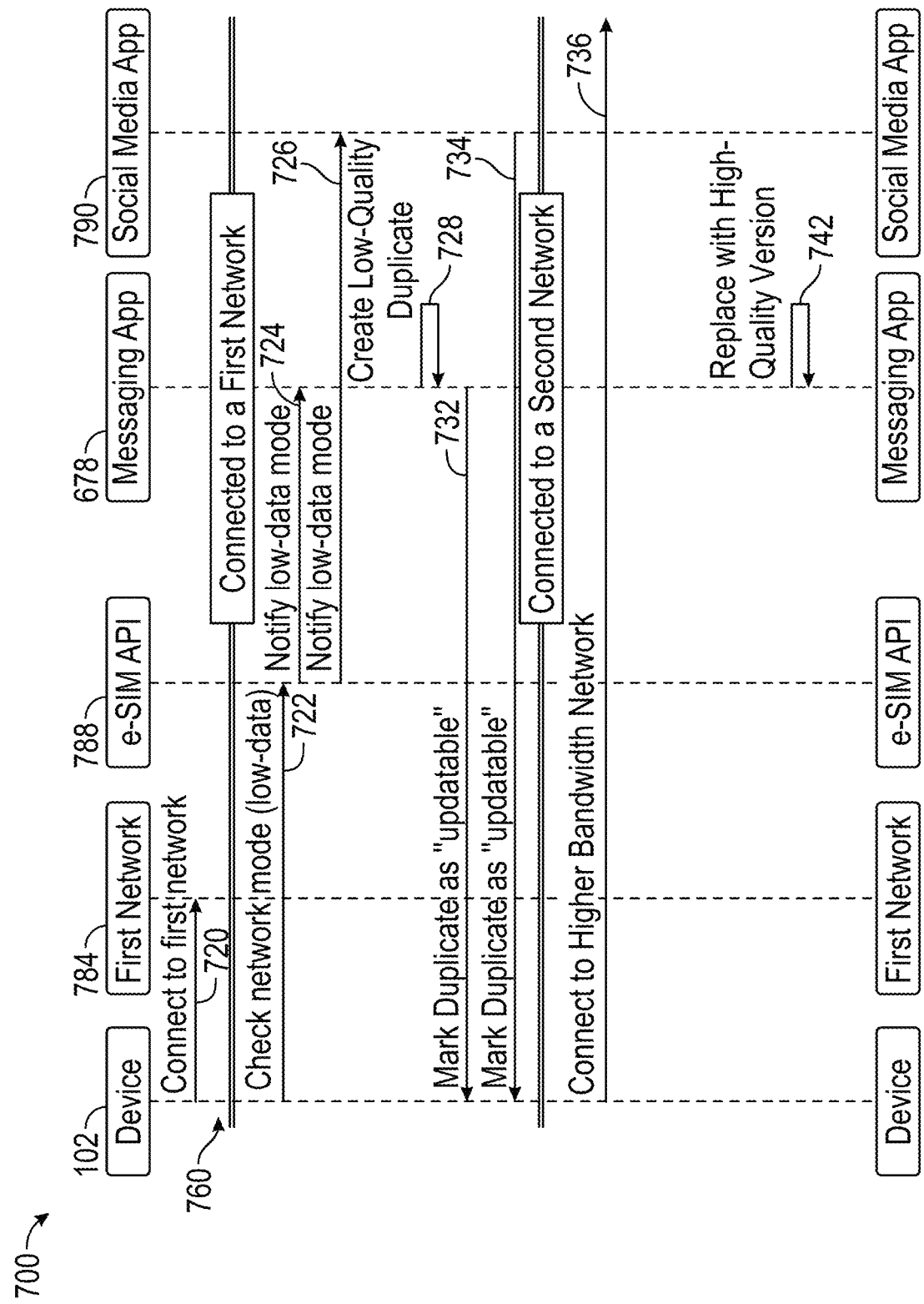
FIG. 7 is an example sequence diagram defining communication between components and applications of a device to adjust media asset quality based on network characteristics, in accordance with embodiments of the disclosure.
Figure 7:
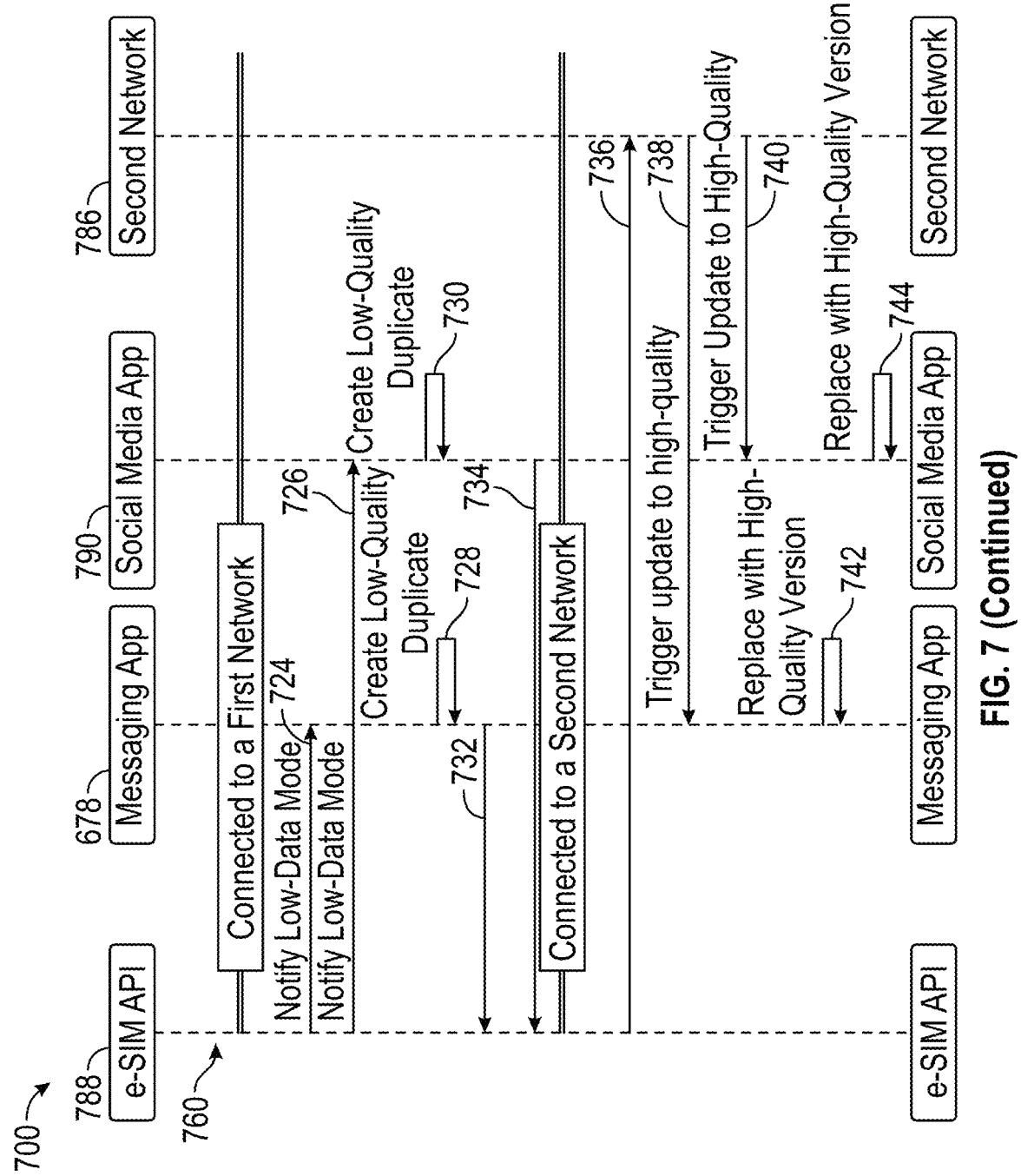

FIG. 7 is an example sequence diagram 700 defining communication between components and applications of a device (e.g., device 102) to adjust media asset quality based on network characteristics, in accordance with embodiments of the disclosure.

The sequence diagram 700 depicts messages between entities during a process 760. The process 760 may be implemented, in whole or in part, by one or more systems or devices described herein. The entities include the device 102, a first network 784, a second network 786, an e-SIM API 788 (or, e.g., e-SIM provisioning system 572 in FIG. 5 or e-SIM 674 or device API 676 in FIG. 6), the messaging application 678, and a social media application 790. In some embodiments, any of the messaging application 678 and social media application 790 are third-party applications.

The process 760 includes the device 102 connecting 720 to a first network 784. In some embodiments, the device 102 is already connected to the first network 784. Operations 722-734 are performed while the device 102 is connected to the first network 784. The device 102 checks 722 a network mode from the e-SIM API 788. In the embodiment depicted in FIG. 7, the network mode is a low-data mode, which may restrict available bandwidth or impose a datacap. In some embodiments, the device 102 determines the network mode is a low-data mode by determining a connection speed to the first network is below a speed threshold. In some implementations, the speed threshold is at least 0.5 Mbps. In some implementations, the speed threshold is at least 1 Mbps. In some implementations, the speed threshold is at least 10 Mbps. In some implementations, the speed threshold is at least 25 Mbps. The e-SIM API 788 notifies 724 the messaging application 678 that the network is in a low-data mode. The e-STM API 788 notifies 726 the social media application 790 that the network is in a low-data mode. The messaging application 678 creates 728 low-quality duplicates of messages or photos that are sent while in low-data mode. The social media application 790 creates 730 low-quality duplicates of messages, posts, or photos that are sent or posted while in low-data mode. The messaging application 678 marks 732 the low-quality duplicates as updatable. The social media application 790 marks 734 the low-quality duplicates as updatable.

In some embodiments, creating the low-quality duplicates includes reducing metadata or other embedded or included data. In some embodiments, the low-quality duplicates are marked as to be updated later using a flag. In some embodiments, the low-quality duplicates are sent to a recipient (e.g., a website, network, application, or device). In some implementations, the recipient's device displays an indicator that the low-quality duplicates will be updated at a later time, such as discussed below in relation to FIG. 9A.

Operations 736-744 are performed while the device 102 is connected to the second network 786. In the embodiment depicted in FIG. 7, the second network 786 has a higher bandwidth and/or data speeds than the first network 784. The device 102 connects 736 to the second network 786. In some embodiments, the device 102, when connected to the second network 786, has at least one of a greater bandwidth, faster connection speed, or higher data transmission capacity than when compared to the first network 784. The second network 786 triggers 738 the messaging application 678 to update the messages or media assets (e.g., photos, videos, animations, or other digital content, to name a few examples) that were sent while in a low-data mode to be replaced with respective high-quality versions. The second network 786 triggers 740 the social media application 790 to update the messages, posts, or media assets that were sent while in a low-data mode to be replaced with respective high-quality versions. The messaging application 678 replaces 742 the low-quality versions of messages or photos with high-quality versions. The social media application 790 replaces 744 the low-quality versions of messages, posts, or photos with high-quality versions.

In some embodiments, once the device 102 connects to the second network 786, the flags trigger the update of the low-quality duplicates. In some embodiments, the high-quality versions are the original versions. In some embodiments, the high-quality versions are compressed or reduced file size versions of the original versions. In some embodiments, the messaging application 678 and/or the social media application 790 updates the low-quality duplicates by sending data that comprises the delta between the low-quality duplicates and their respective high-quality versions, which may require less bandwidth than sending the full high-quality versions. In other embodiments, the high-quality version of the content (e.g., still photo) is automatically retransmitted to the recipient. The high-quality version may automatically replace the originally sent low-quality version or prompt the recipient to accept or reject replacing the originally received content (e.g., still photo, video recording, etc.).

In some embodiments, the messaging application 678 and/or the social media application 790 send the low-quality duplicate while the first network is experiencing congestion from multiple devices consuming bandwidth, such as at an arena during a sporting event or concert, or generally during an event such as New Year's Eve. In some embodiments, the connection speed to the first network increases to a speed that is at or above the speed threshold. In such embodiments, operations 736-744 are performed while the device 102 is connected to the first network having the speed above the speed threshold. In some examples, the messaging application 678 and/or the social media application 790 replace the low-quality versions with high-quality versions when the connection speed to the first network is at or above the speed threshold (e.g., congestion decreases as the device 102 is no longer located at the arena or bandwidth consumption by devices connected to the first network decreases).

In some embodiments, the device 102, or control circuitry (e.g., control circuitry 190 in FIG. 1 or control circuitry 1512, 1611, discussed below in relation to FIGS. 15 and 16), executes the network status application to determine status or availability of any of the first network or second network. In some embodiments, the device 102 or control circuitry executes the quality management application to create low-quality duplicates for and/or replace the low-quality duplicates with high-quality version for any of the messaging application 678 or social media application 790.

In some embodiments, the operations of the process 760 are an enhancement over approaches using lazy loading to load content. In some implementations, connectivity to the first network may not be constant, and as a result, using lazy loading may not load content when it is accessed if there is no connectivity.

In some embodiments, any one of the messaging application 678 or social media application 790 generate a progressive jpeg for images that are to be sent or posted. The initial image that is sent/posted is a low-resolution version of the original image. The sent/posted image gradually increases in quality, as bandwidth permits, until it reaches its original resolution. In some embodiments, a similar approach is used to send/post any of audio, frames of a video, or other digital content.

In some embodiments, any of the first network 784 or the second network 786 include any of a cellular network, satellite network, Wi-Fi network, or other wired or wireless network. In some embodiments, the first network 784 and/or second network 786 is a Wi-Fi network. In some embodiments, a device API (e.g., device API 676 in FIG. 6) replaces or is used in addition to the e-SIM API 788.

Figure 8B:
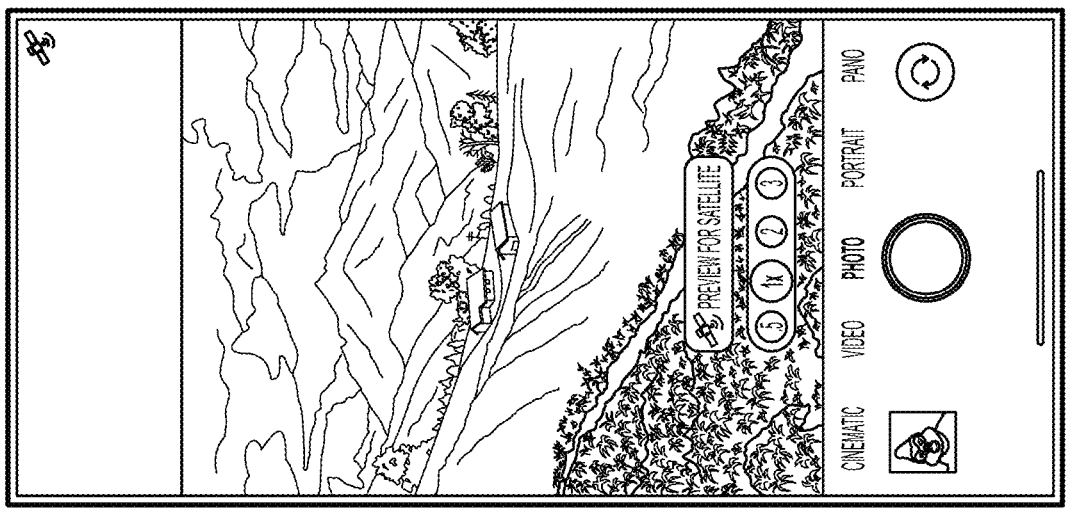
FIGS. 8A and 8B are representations of different graphical user interfaces of a device showing a preview of a reduced quality media asset to be transmitted through a satellite network provider, in accordance with embodiments of the disclosure.
Figure 8A:
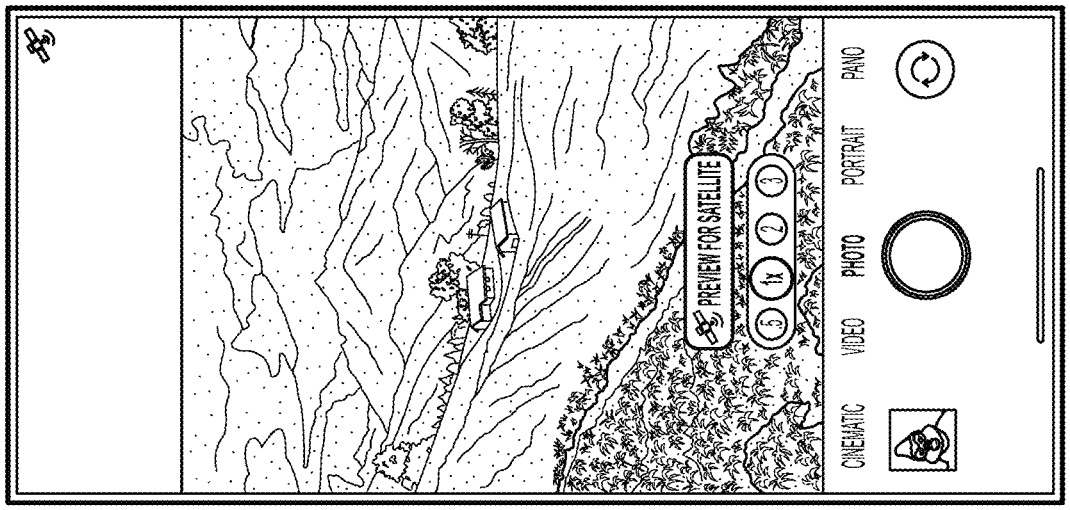

FIGS. 8A and 8B are representations of different GUIs of a device (e.g., device 102 in FIGS. 1, 2, and 11 or device 902, 1500 or user equipment 1607, 1608, 1610, discussed below in relation to FIGS. 9, 15, and 16) showing a preview of a reduced quality media asset to be transmitted through a satellite network provider (e.g., satellite network providers 116, 118 or 216 in FIGS. 1 and 2), in accordance with embodiments of the disclosure.

The GUI includes a status bar on a topmost portion, a captured image on a middle portion, and camera controls (e.g., button to capture an image and selectable camera modes) on a bottom portion. The status bar indicates the device is connected to a SATCOM network (e.g., satellite constellation 110 in FIG. 1; SATCOM network 210 in FIGS. 2, 4, and 5; first or second network 784, 786 in FIG. 7; or communication network 1606, discussed below in relation to FIG. 16) through a satellite network provider.

Referring to FIG. 8A, the captured image is shown as an original quality image. A "preview for satellite" selectable button is overlaid on a bottom, middle portion of the image. Referring to FIG. 8B, the "preview for satellite' button is shown as selected, and a reduced quality version of the captured image is shown. Selecting the button may generate the reduced quality version. In some embodiments, the reduced quality version is generated for preview and a separate selection is used to save the reduced quality version.

Figure 9B:
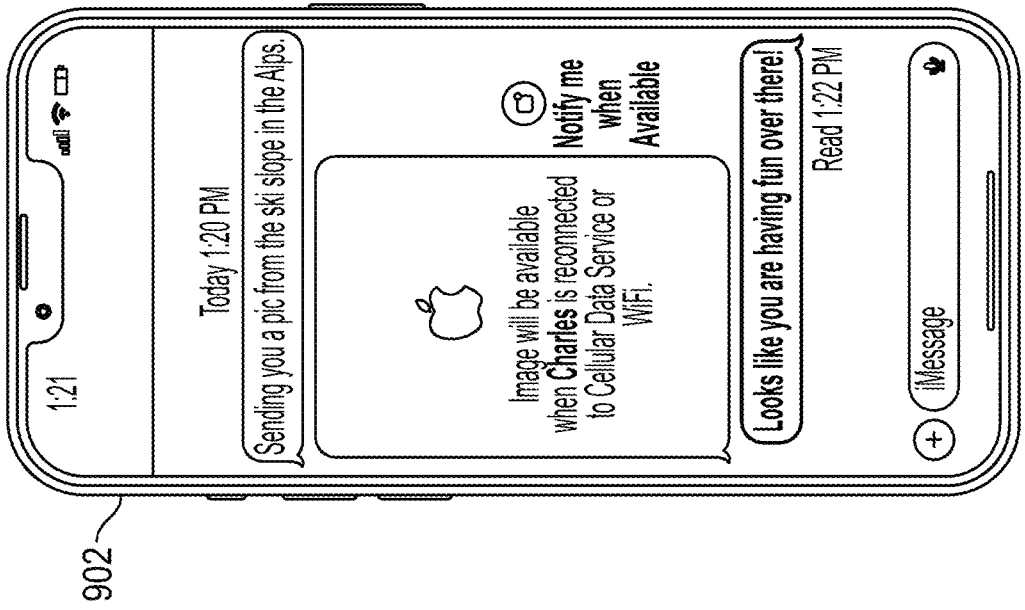
FIGS. 9A and 9B are representations of different graphical user interfaces of a device showing a reduced quality media asset received in an application, in accordance with embodiments of the disclosure.
Figure 9A:
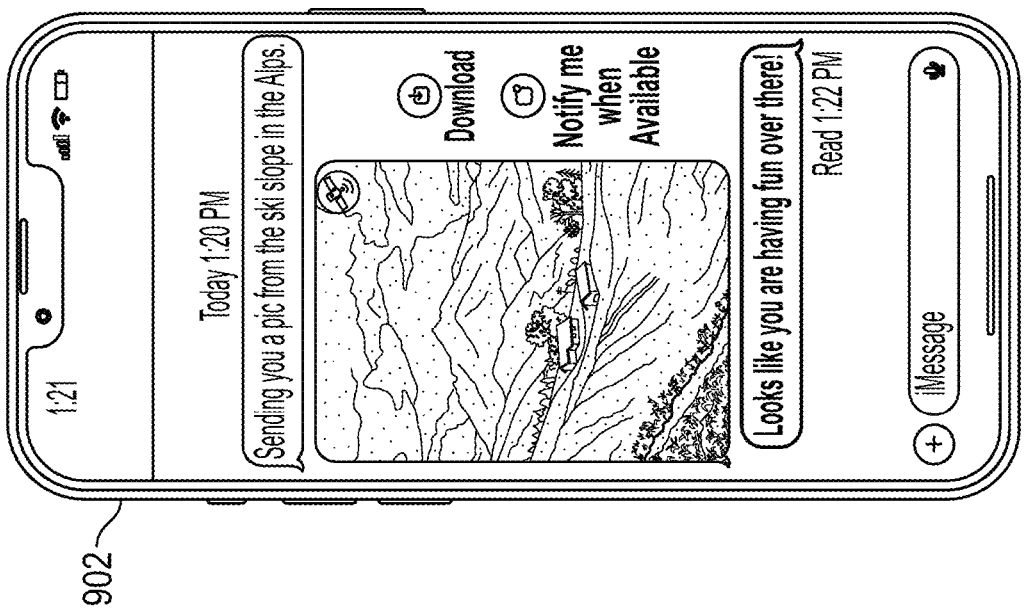

FIGS. 9A and 9B are representations of different GUIs of a device 902 (or, e.g., device 102 in FIGS. 1, 2, and 11 or device 1500 or user equipment 1607, 1608, 1610, discussed below in relation to FIGS. 15 and 16) showing a reduced quality media asset received in an application (e.g., messaging application 678), in accordance with embodiments of the disclosure.

In the embodiments depicted in FIGS. 9A and 9B, the GUI is that of a messaging application that includes conversation "bubbles" between the device 902 and another device. The conversation bubbles on the left side of the GUI are received from the another device and the bubbles on the right side are sent by the device 902. In each of FIGS. 9A and 9B, the another device sends a message "sending you a pic from the ski slope in the Alps" and a corresponding image to the device 902 over a bandwidth-restricted connection (e.g., SATCOM network 210 in FIG. 2). The device 902 sends a response "looks like you are having fun over there!" to the another device.

In the embodiment depicted in FIG. 9A, the device 902 receives, and the GUI displays, a low-quality image from the another device. To the right of the low-quality image are two selectable options to "download" the low-quality image or to "notify me when updated." Selecting the "notify me when updated" option results in a notification displayed on the GUI when the low-quality image is replaced with a higher quality image, such as discussed in relation to FIG. 7.

In the embodiment depicted in FIG. 9A, the device 902 receives a low-quality image from the another device, or information indicating that an image will be sent once the network connection of the another device improves. In the embodiment depicted in FIG. 9B, the GUI of the device 902 displays a placeholder image containing text "image will be available when party is reconnected to cellular data service or Wi-Fi." In some embodiments, the placeholder image is stored on the device 902. In some implementations, the placeholder image is stored on the device as part of the messaging application (e.g., pre-installed). To the right of the placeholder image is a selectable option to "notify me when updated."

In some embodiments, the device 902 receives the original quality version of the image at a later time. The device 102 generates for display, the original quality version in the sequential conversation thread. In some implementations, the original quality version replaces the low-quality image at the same sequential position in the sequential conversation thread.

Figure 10:
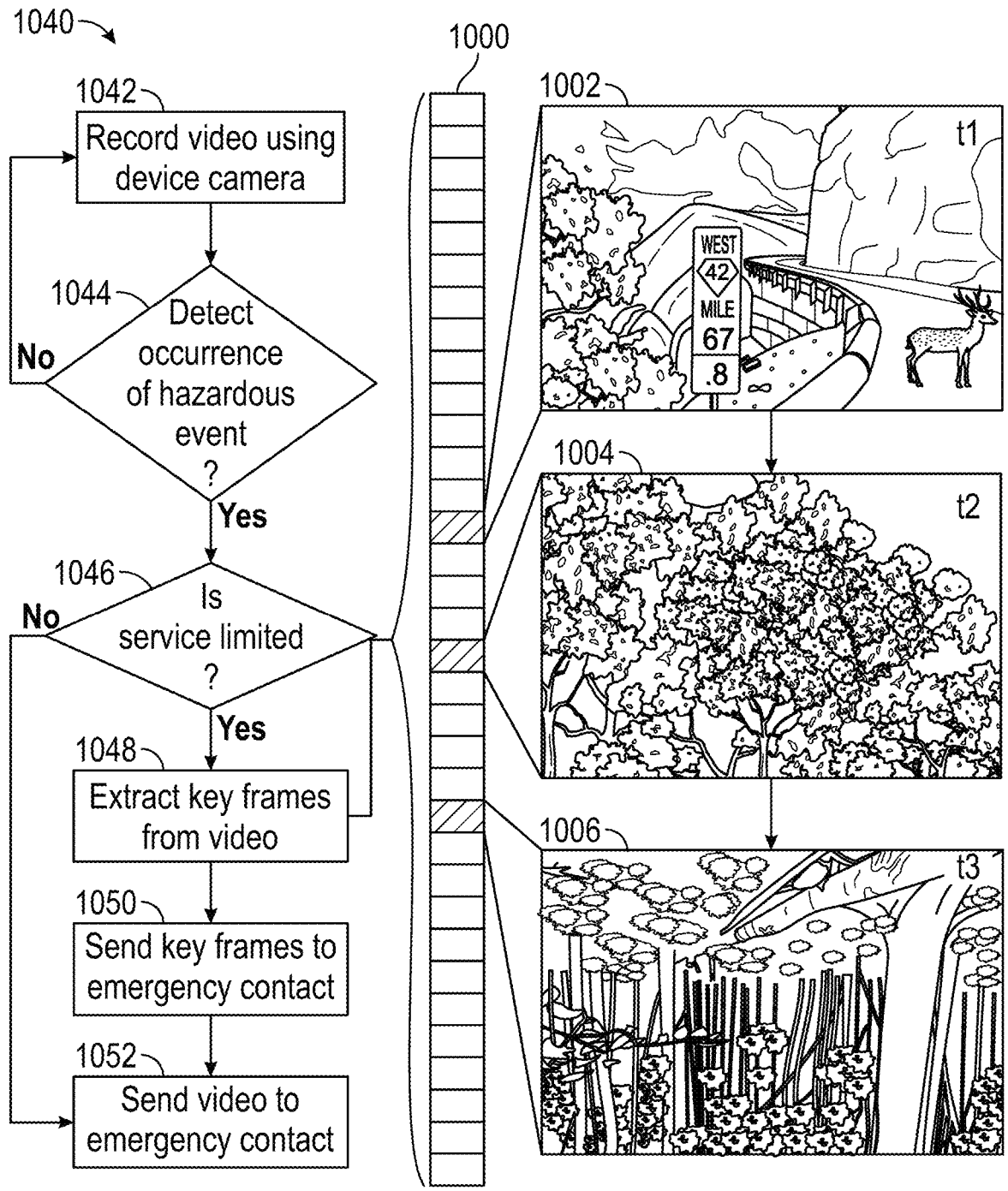
FIG. 10 is a schematic illustration of a process for extracting key frames from a media asset to generate a reduced quality media asset, in accordance with embodiments of the disclosure.

FIG. 10 is a schematic illustration of a process 1040 for extracting key frames 1002-1006 from a media asset (e.g., a video 1000) to generate a reduced quality media asset, in accordance with embodiments of the disclosure. The processes 1040 shown in FIG. 10 may be implemented, in whole or in part, by one or more systems or devices described herein.

The process 1040 starts at operation 1042 with control circuitry (e.g., control circuitry 190 in FIG. 1 or control circuitry 1512, 1611, discussed below in relation to FIGS. 15 and 16) recording video using a camera of the device (e.g., device 102 in FIGS. 1, 2, and 11; device 902 in FIG. 9; or device 1500 or user equipment 1607, 1608, 1610, discussed below in relation to FIGS. 15 and 16). In the embodiment depicted in FIG. 10, the device is a camera of a vehicle or coupled to a vehicle. In some embodiments, the control circuitry receives a video feed from a camera communicatively coupled to the device.

The process 1040 continues to operation 1044 with the control circuitry determining whether a hazardous event has occurred. In some embodiments, the hazardous event includes any of an impact to the vehicle, incapacitation of a driver of the vehicle, or failure or reduced performance of a system of the vehicle (e.g., engine, brakes, lights, or windows). In some implementations, the control circuitry interfaces with vehicle control circuitry (e.g., via I/O circuitry) to determine a hazardous event has occurred. In some implementations, the control circuitry may use data from sensors (e.g., sensors 1506, discussed below in relation to FIG. 15) to determine a hazardous event has occurred. If the determination is no, then the process 1040 continues to operation 1042. If the determination is yes, then the process 1040 continues to operation 1046 and the control circuitry determines if service to the device is limited (e.g., by executing the quality management application).

If the determination at operation 1046 is no, then the process 1040 continues to operation 1052 and I/O circuitry (e.g., I/O circuitry 192 in FIG. 1 or I/O path 1516, 1612, discussed below in relation to FIGS. 15 and 16) sends video from the camera to an emergency contact or to emergency services. In some embodiments, full file is sent (i.e., complete recording). In some embodiments, video from a predetermined amount of time from before and from after the event is sent. In some embodiments, the emergency contact includes any of a first responder, fire department, police department, roadside assistance service, or personal emergency contact.

If the determination at operation 1046 is yes, then the process 1040 continues to operation 1048 and the control circuitry extracts key frames 1002-1006 from the video 1000 (e.g., by executing the quality management application). In some embodiments, the key frames are randomly selected. In some embodiments, the key frames are selected based on a pattern (e.g., every "nth" frame in the video 1000). In the embodiment depicted in FIG. 10, the key frames are determined by analyzing the frames to determine frames that are associated with the hazardous event or the location of the vehicle. A first key frame 1002 is at time t1 and includes a mile marker and an animal (e.g., a deer) in the middle of a winding road having a cliff on one side. The first key frame 1002 includes the location of the impact event (e.g., the mile marker) and the cause of the hazardous event (e.g., the deer in the road). A second key frame 1004 is at a time t2 and includes a view of trees below the road as the vehicle falls of the cliff (e.g., from swerving to avoid hitting the deer). A third key frame 1006 is at a time t3 and includes a view of the surrounding forest as the vehicle rests upside down on its roof In some implementations, an algorithm, such as a trained deep learning model or convolutional neural network, is used to identify the key frames.

The process 1040 continues to operation 1050 with the control circuitry sending the key frames to the emergency contact. In some embodiments, if the control circuitry determines the service is adequate, or later becomes adequate, the process 1040 continues to operation 1052.

In some embodiments, the operations of the process 1040 are an enhancement over car accident reporting, which may use sensor data or text or voice communication. In some implementations, the video sent to the emergency contact provides additional context such as any of a visual of the surrounding environment, severity of the damage, or current state of passengers in the vehicle.

In some embodiments, sending key frames or videos of the hazardous event to emergency services can help them prioritize their resources. For example, some types of accidents may require immediate attention (e.g., incapacitation of a driver, severe deformation of the vehicle, or harmful surrounding environmental conditions such as extreme heat or cold or being underwater), while other types may not (e.g., inoperable vehicle in a safe location along a well-traveled road and pleasant weather).

In some embodiments, the device is a video doorbell having a camera. In some implementations, the video doorbell is attached to a house and, in operation 1044, detects any of an intrusion, unauthorized access to the house, failed attempt to enter the house (e.g., entering a predetermined amount of incorrect codes on a door lock), damage or vandalism to the house, or a theft of a package. In some implementations, in operations 1050 and/or 1052, the control circuitry sends key frames or video to any of a device of an owner, administrator, super user, or shared-access user of the video camera.

Figure 11:
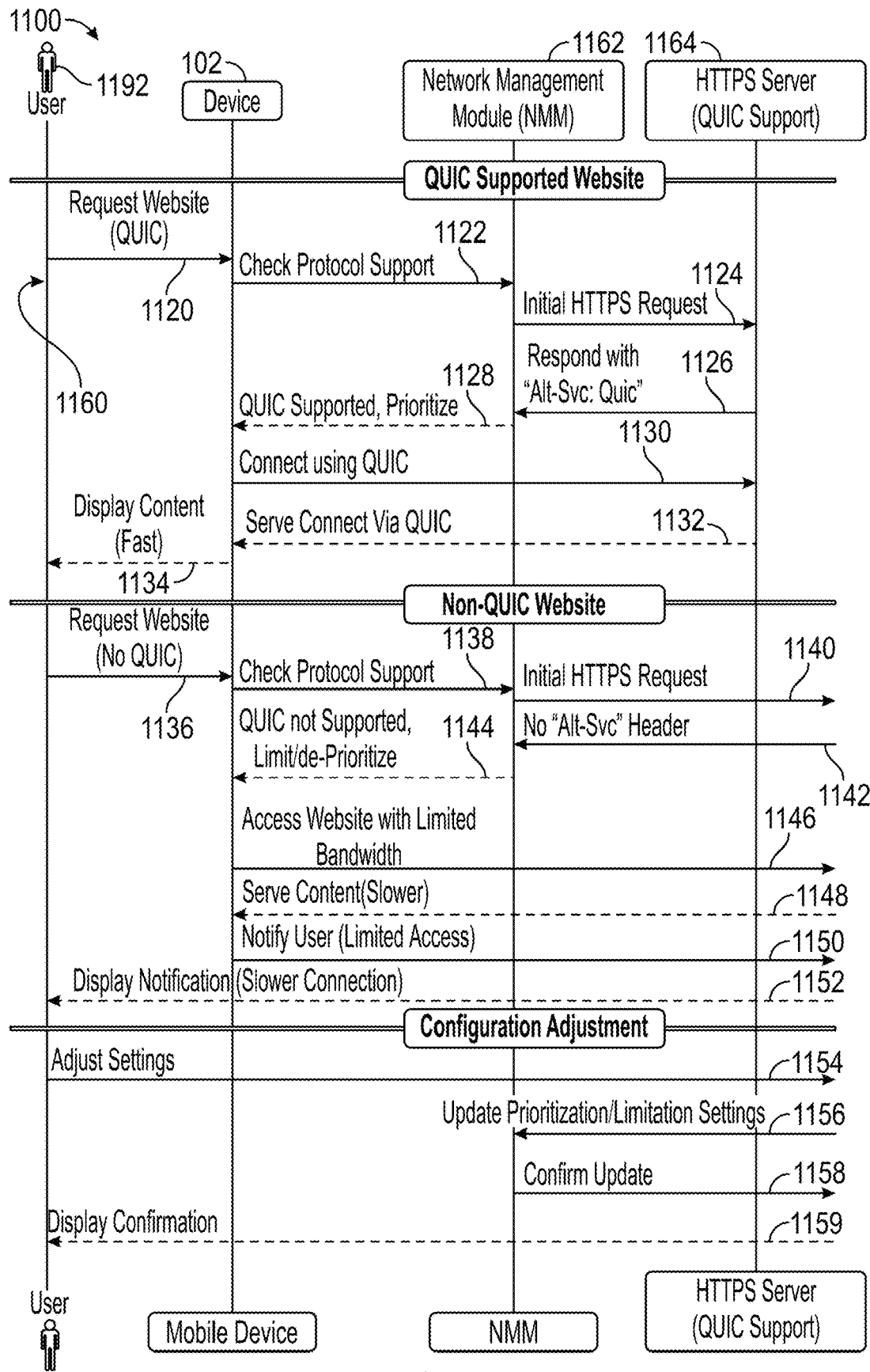
FIG. 11 is an example sequence diagram defining communication between a system for provisioning a device to a satellite network provider and websites using different transport protocols, in accordance with embodiments of the disclosure.
Figure 11:
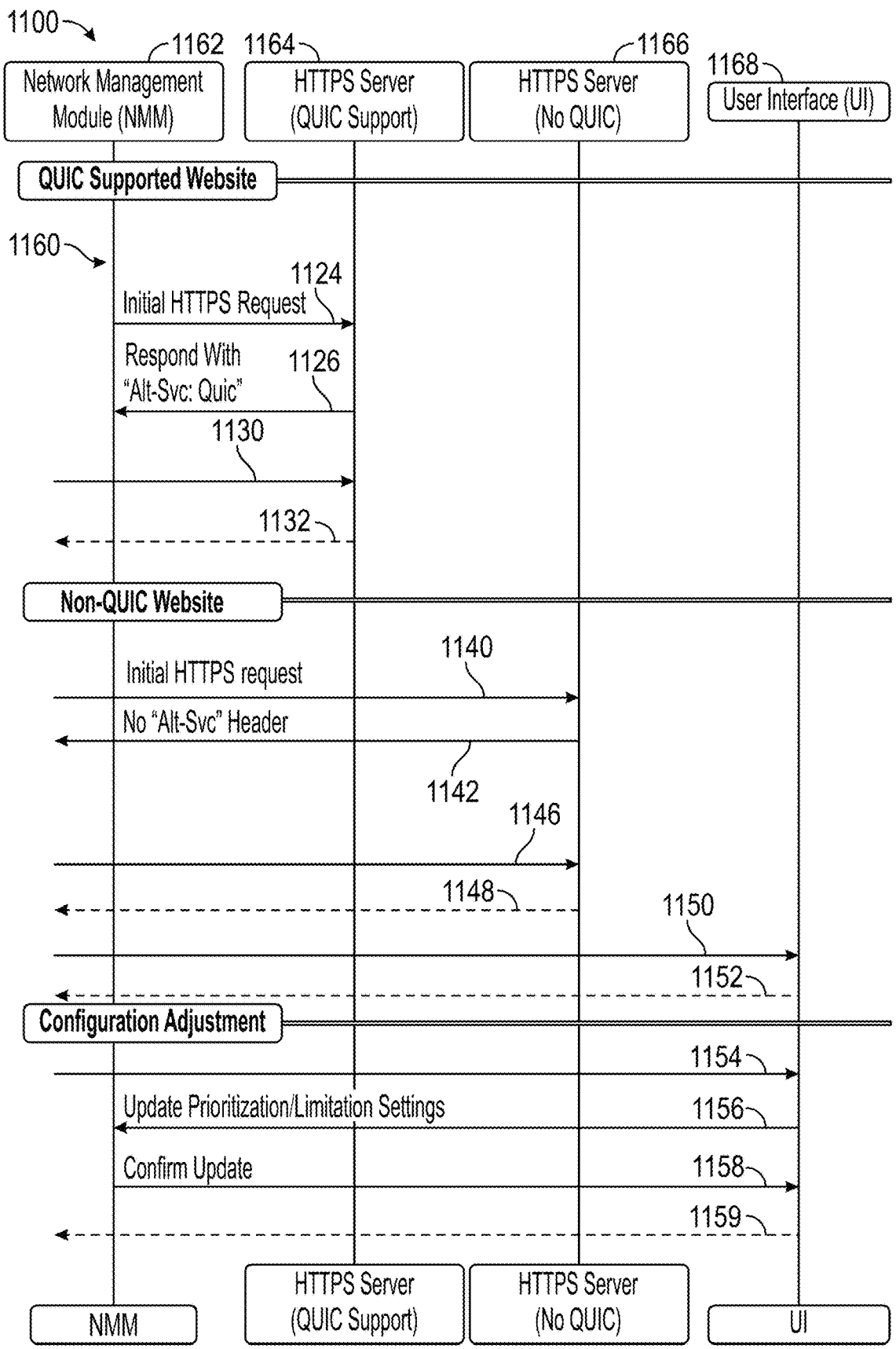

FIG. 11 is an example sequence diagram 1100 defining communication between a device (e.g., device 102) and other entities to access and prioritize websites using different transport protocols, in accordance with embodiments of the disclosure.

The sequence diagram 1100 depicts messages between entities during a process 1160. The process 1160 may be implemented, in whole or in part, by one or more systems or devices described herein. The entities include a user 1192, the device 102, a network management module (NMM) 1162, a first HTTPS server 1164, a second HTTPS server 1166, and a user interface 1168 (or, e.g., user interface 130 in FIG. 1 or user input interface 1502, discussed below in relation to FIG. 15). The first HTTPS server 1164 supports a fast communication technology that streamlines HTTP traffic (e.g., a QUIC-based network protocol, such as gQUIC or IETF QUIC). In some embodiments, the first HTTPS server 1164 uses QUIC as an underlying transport protocol to deliver HTTPS traffic. The second HTTPS server 1166 does not support the QUIC network protocol. In some embodiments, the second HTTPS server 1166 supports any one or combination of a transmission control protocol (TCP) or transport layer security (TLS) network protocol. In some implementations, the second HTTPS server 1166 uses any one or combination of a TCP or TLS as an underlying transport protocol to deliver HTTPS traffic. The QUIC protocol may result in reduced latency and improved data transmission speeds for communication with the first HTTPS server 1164 when compared to the second HTTPS server 1166.

In some embodiments, the NMM 1162 is a hardware or software component designed to facilitate the administration, monitoring, and management of a network. In some implementations, the NMM 1162 evaluates communication protocols used by websites and services accessed by the device 102. In some embodiments, any of the device 102, a system (e.g., system 100, 572 in FIGS. 1 and 5) for provisioning the device 102, a SATCOM network (e.g., satellite constellation 110 in FIG. 1; SATCOM network 210 in FIGS. 2, 4, and 5; first or second network 784, 786 in FIG. 7; or communication network 1606, discussed below in relation to FIG. 16), or a different network (e.g., terrestrial network 104 in FIG. 1; first or second network 784, 786 in FIG. 7; or communication network 1606, discussed below in relation to FIG. 16) comprises the NMM 1162. In some embodiments, the user interface 1168 is of the device 102. In some embodiments, the process 1160 is used to prioritize or limit access to websites based on their use of QUIC.

The process 1160 includes operations for different network protocols and adjusting prioritization of network traffic. Operations 1120-1134 are in relation to accessing a QUIC supported website. The device 102 receives 1120 a request to access a QUIC supported website from the user 1192. The device 102 checks 1122 with the NMM 1162 for a protocol support of the requested website. The NMM 1162 sends 1124 an initial HTTPS request to the first HTTPS server 1164, which is an HTTPS server for the requested website. In some embodiments, HTTPS requests are sent through a network (e.g., satellite constellation 110 or terrestrial network 104 in FIG. 1, SATCOM network 210 in FIGS. 2, 4, and 5, first or second network 784, 786 in FIG. 7, or communication network 1606, discussed below in relation to FIG. 16). The first HTTPS server 1164 responds 1126 to the NMM 1162 indicating the first HTTPS server 1164 and/or the requested website supports QUIC. In some embodiments, the response is inspected for the presence of an "Alt-Svc" (Alternative Service) header, which may be used to indicate availability of an alternative service supporting QUIC. In some implementations, in response to, based at least in part on, or upon, establishing the initial HTTPS connection, the device and/or NMM 1162 analyzes HTTP response headers received from the server. In some implementations, the device and/or NMM 1162 parses the "Alt-Svc" header is parsed to identify availability of the QUIC protocol, along with the specific host and port on which the QUIC service is accessible. In some examples, the "Alt-Svc" header provides details such as the alternative service's protocol identifier (e.g., "quic="), the port number, and optionally, the maximum allowed age (e.g., ma=) of the information and supported QUIC versions (e.g., v=" ").

The NMM 1162 informs 1128 the device 102 that the website is QUIC supported. In some embodiments, the NMM 1162 informs the device 102 that network traffic to the requested website will be prioritized based at least in part on the website supporting QUIC. The device 102 connects 1130 to the first HTTPS server 1164 to access the website using the QUIC network protocol. In some embodiments, the device 102 connects to the first HTTPS server 1164 using the QUIC protocol on a specified host and port for subsequent communications. The first HTTPS server 1164 serves 1132 content from the website to the device 102 using QUIC. The device 102 displays 1134 the content from the website to the user 1192. In some embodiments, the user interface 1168 displays the content.

Operations 1136-1152 are in relation to accessing a non-QUIC supported website. The device 102 receives 1136 a request to access a non-QUIC supported website from the user 1192. The device 102 checks 1138 with the NMM 1162 for a protocol support of the requested website. The NMM 1162 sends 1140 an initial HTTPS request to the second HTTPS server 1166, which is an HTTPS server for the requested website. The second HTTPS server 1166 responds 1142 to the NMM 1162 indicating the second HTTPS server 1166 and/or the requested website do not support QUIC. In some embodiments, no "Alt-Svc" (Alternative Service) header is found. The NMM 1162 informs 1144 the device 102 that the website is not QUIC supported. In some embodiments, the NMM 1162 informs the device of the network protocol (e.g., TCP or TCP and TLS) of the requested website. In some implementations, the device 102 determines the requested website is not QUIC supported in response to, or based at least in part on, the information from the NMM 1162. In some embodiments, the NMM 1162 informs the device 102 that network traffic to the requested website will not be prioritized, or will be limited or de-prioritized, based at least in part on the website not supporting QUIC.

The device 102 connects 1146 to the second HTTPS server 1166 to access the requested website using a non-QUIC network protocol. In some embodiments, the website is accessed with restrictions or limitation on bandwidth. The second HTTPS server 1166 serves 1148 content from the website to the device 102 at a slower speed or bandwidth. In some embodiments, the content is served at a slower speed or bandwidth than what is available through the network. In some embodiments, the content is served at a slower speed or bandwidth than it would be if the content was from a QUIC supported website. In some embodiments, the second HTTPS server 1166 limits the data rate for the non-QUIC supported connections. In some embodiments, the second HTTPS server 1166 implements a lower priority within the server or network's queue management system. In some embodiments, the user interface 1168 displays the content. The device 102 notifies 1150 the user 1192 there is limited access to the website via the user interface 1168. The user interface 1168 displays 1152 a notification to the user 1192 that a slower connection is being used to access the content.

Operations 1154-1159 are in relation to configuration adjustment of prioritization of websites. The user 1192 requests 1154 to adjust settings through the user interface 1168. In some embodiments, the device 102 receives the request from the user 1192 through the user interface 1168. The user interface 1168 updates 1156 the prioritization and/or limitation settings for the NMM 1162. In some embodiments, the user interface 1168 requests the NMM 1162 update the settings. In some embodiments, the device 102 requests the NMM 1162 enact the updates. The NMM 1162 confirms 1158 the update via the user interface 1168. In some embodiments, the NMM 1162 confirms 1158 the update with the device 102. The user interface 1168 displays 1159 confirmation of the update to the user 1192.

Figure 12:
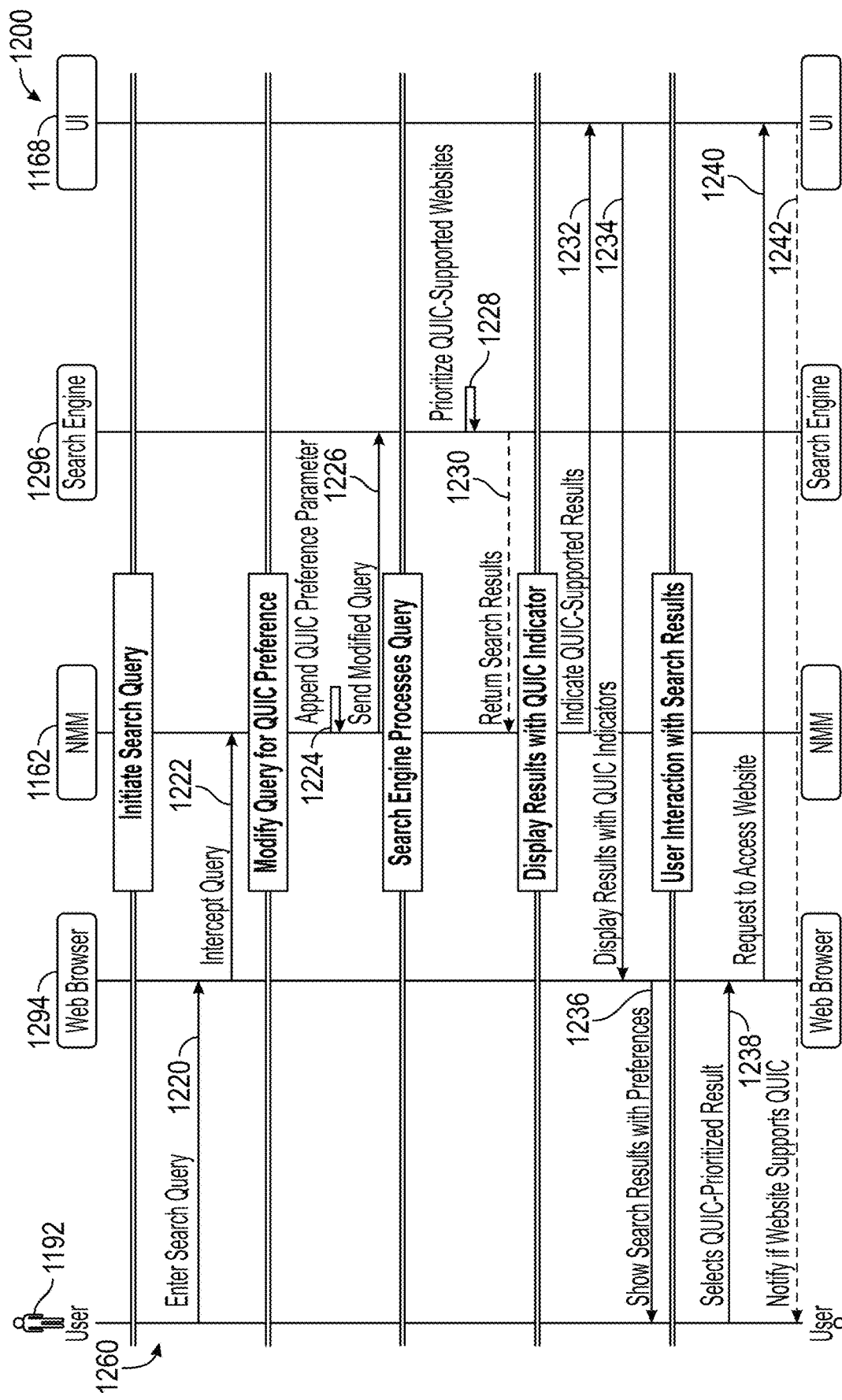
FIG. 12 is an example sequence diagram defining communication between a system for provisioning a device to a satellite network provider and a search engine to use transport protocols to prioritize search results, in accordance with embodiments of the disclosure.

FIG. 12 is an example sequence diagram 1200 defining communication between different entities to prioritize search results using different transport protocols, in accordance with embodiments of the disclosure.

The sequence diagram 1200 depicts messages between entities during a process 1260. The process 1260 may be implemented, in whole or in part, by one or more systems or devices described herein. The entities include the user 1192, a web browser 1294, the NMM 1162, a search engine 1296, and the user interface 1168. In some embodiments, the process 1260 is used to prioritize or limit access to search results based on a website's use of QUIC. In some embodiments, the process 1260 is used when connected to a network (e.g., terrestrial network 104 or satellite constellation 110 in FIG. 1, SATCOM network 210 in FIGS. 2, 4, and 5, or first network 784 in FIG. 7, or communication network 1606, discussed below in relation to FIG. 16) having limited bandwidth.

The process 1260 includes operations for different network protocols and adjusting prioritization of search results. Operations 1220-1222 are in relation to initiating a search query. The process 1260 includes the web browser 1294 receiving 1220 a search query from the user 1192. In some embodiments, the web browser 1294 is a mobile browser. In some embodiments, the web browser 1294 is run on and/or executed by a device (e.g., device 102 in FIGS. 1, 2, and 11; device 902 in FIG. 9; or device 1500 or user equipment

1607, 1608, 1610, discussed below in relation to FIGS. 15 and 16). The NMM 1162 intercepts 1222 the search query from the web browser 1294.

Operations 1224-1226 are in relation to modifying the search query for QUIC preference. The NMM 1162 appends 1224 a QUIC preference parameter to the search query. In some embodiments, the NMM 1162 appends a flag to the search query. The NMM 1162 sends 1226 the modified search query to the search engine 1296.

Operations 1228-1230 are in relation to the search engine 1296 processing the search query. The search engine 1296 prioritizes 1228 QUIC supported websites in the search results. The search engine 1296 returns 1230 the prioritized search results to the NMM 1162.

Operations 1232-1236 are in relation to displaying results with a QUIC indicator. The NMM 1162 indicates 1232 websites that support QUIC in the search results to the user interface 1168. The user interface 1168 displays 1234 the search results with the QUIC indicators in the web browser 1294. The web browser 1294 shows 1236 the prioritized search results to the user 1192. In some embodiments, the user interface 1168 displays the web browser 1294. In some embodiments, an indicator is shown for websites supporting QUIC. In some implementations, any of a picture, image, text, colored text, text styling, or animations, to name a few examples, are used to distinguish the websites supporting QUIC from the websites that do not support QUIC.

Operations 1238-1242 are in relation to user interaction with the search results. The user 1192 selects 1238 a website in the web browser 1294. In some embodiments, the user 1192 selects 1238 a website supporting QUIC. The web browser 1294 requests 1240 to access the selected website via the user interface 1168. In some embodiments, the user interface 1168 notifies 1242 the user 1192 if the selected website supports QUIC. In some implementations, the user interface 1168 notifies 1242 the user 1192 via the web browser 1294.

Figure 13:
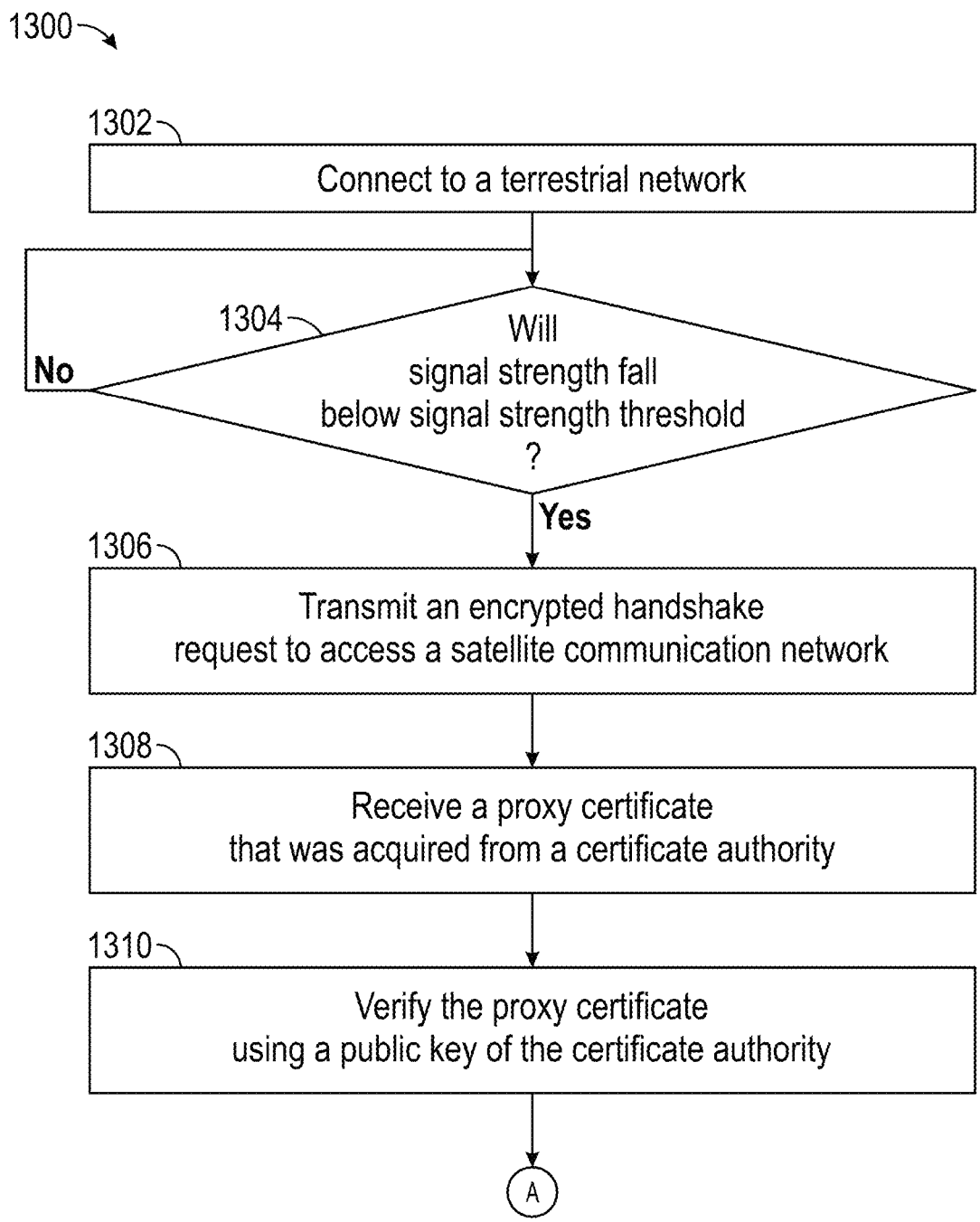
FIG. 13 is a schematic illustration of a process for provisioning a device to a satellite network provider without service from a terrestrial network, in accordance with embodiments of the disclosure.
Figure 13:
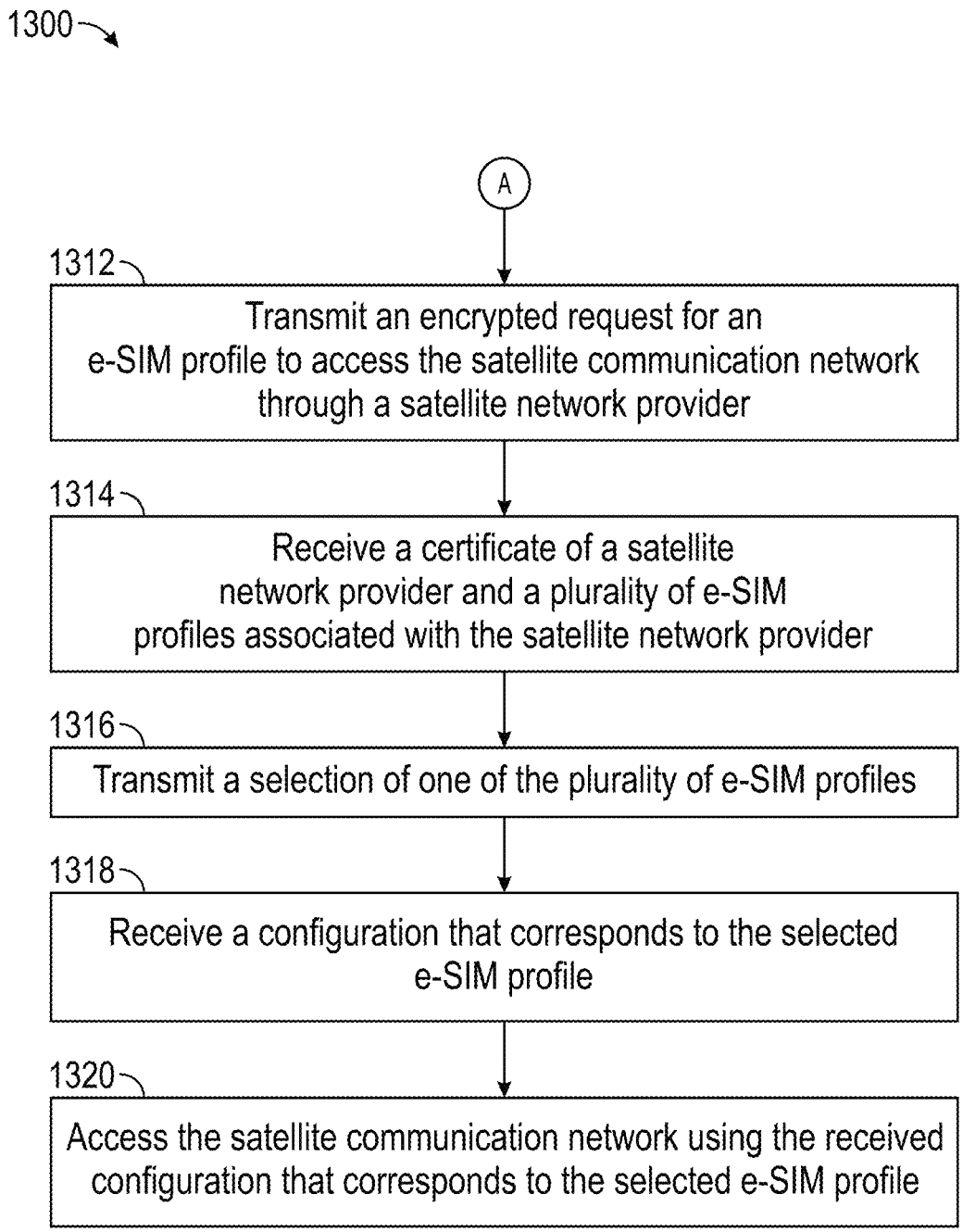

FIG. 13 is a schematic illustration of a process 1300 for provisioning a device (e.g., device 102 in FIGS. 1, 2, and 11; device 902 in FIG. 9; or device 1500 or user equipment 1607, 1608, 1610, discussed below in relation to FIGS. 15 and 16) to a satellite network provider (e.g., satellite network providers 116, 118 or 216 in FIGS. 1 and 2) without service from a terrestrial network (e.g., terrestrial network 104 in FIG. 1 or first or second network 784, 786 in FIG. 7, or communication network 1606, discussed below in relation to FIG. 16), in accordance with embodiments of the disclosure. The process 1300 shown in FIG. 13 may be implemented, in whole or in part, by one or more systems or devices described herein. In some embodiments, instructions for applications that provision the device are stored in non-transitory memory, such as discussed in relation to FIGS. 1, 15, and 16, and when executed, perform operations of the process 1300.

The process 1300 begins at operation 1302 with control circuitry (e.g., control circuitry 190 in FIG. 1 or control circuitry 1512, 1611, discussed below in relation to FIGS. 15 and 16) connecting to a terrestrial network. In some embodiments, the control circuitry is part of and/or communicatively coupled to the device.

The process continues to operation 1304 with the control circuitry determining whether a signal strength of a terrestrial network will fall below a signal strength threshold (e.g., by executing the coverage prediction application). In some embodiments, the control circuitry determines whether the signal strength will fall below the signal strength threshold within a degradation time period. If the determination is no, the control circuitry continues to monitor the signal strength. If the determination is yes, the process continues to operation 1306 with I/O circuitry (e.g., I/O circuitry 192 in FIG. 1 or I/O path 1516, 1612, discussed below in relation to FIGS. 15 and 16) transmitting an encrypted handshake request to access a SATCOM network (e.g., satellite constellation 110 in FIG. 1; SATCOM network 210 in FIGS. 2, 4, and 5; first or second network 784, 786 in FIG. 7; or communication network 1606, discussed below in relation to FIG. 16). In some embodiments, the I/O circuitry transmits and/or receives using transceiver circuitry (e.g., transceiver circuitry 132 in FIGS. 1 and 2 or transceiver circuitry 1508, discussed below in relation to FIG. 15) of the device. In some embodiments, the handshake request to access a SATCOM network is encrypted using a public key of an operator of the SATCOM network. In some embodiments, the control circuitry transmits and/or receives requests.

The process continues to operation 1308 with the I/O circuitry receiving a proxy certificate that was acquired from a certificate authority (e.g., certificate authority 108). In some embodiments, the proxy certificate is received from the SATCOM network. In some embodiments, the control circuitry receives the proxy certificate.

The process continues to operation 1310 with the control circuitry verifying the proxy certificate using a public key of the certificate authority.

The process continues to operation 1312 with the I/O circuitry transmitting an encrypted request for an e-SIM profile to access the SATCOM network through a satellite network provider. In some embodiments, the request for an e-STM profile is encrypted using information from the proxy certificate.

The process continues to operation 1314 with the I/O circuitry receiving a certificate of a satellite network provider and a plurality of e-STM profiles associated with the satellite network provider. In some embodiments, the I/O circuitry receives the certificate from the SATCOM network.

The process continues to operation 1316 with the I/O circuitry transmitting a selection of one of the plurality of e-SIM profiles. In some embodiments, the selection is encrypted using information from the certificate of the satellite network provider.

The process continues to operation 1318 with the I/O circuitry receiving a configuration that corresponds to the selected e-SIM profile. In some embodiments, the I/O circuitry receives the configuration from the SATCOM network. In some embodiments, the configuration that corresponds to the selected e-SIM profile is encrypted using a key of the satellite network provider.

The process continues to operation 1320 with the control circuitry accessing the SATCOM network using the received configuration that corresponds to the selected e-SIM profile. In some embodiments, the control circuitry installs an e-SIM, using the received configuration that corresponds to the selected e-SIM profile, to access the SATCOM network.

In some embodiments, the device 102 or control circuitry executes the device provisioning application to perform at least one of the operations of process 1300.

Figure 14:
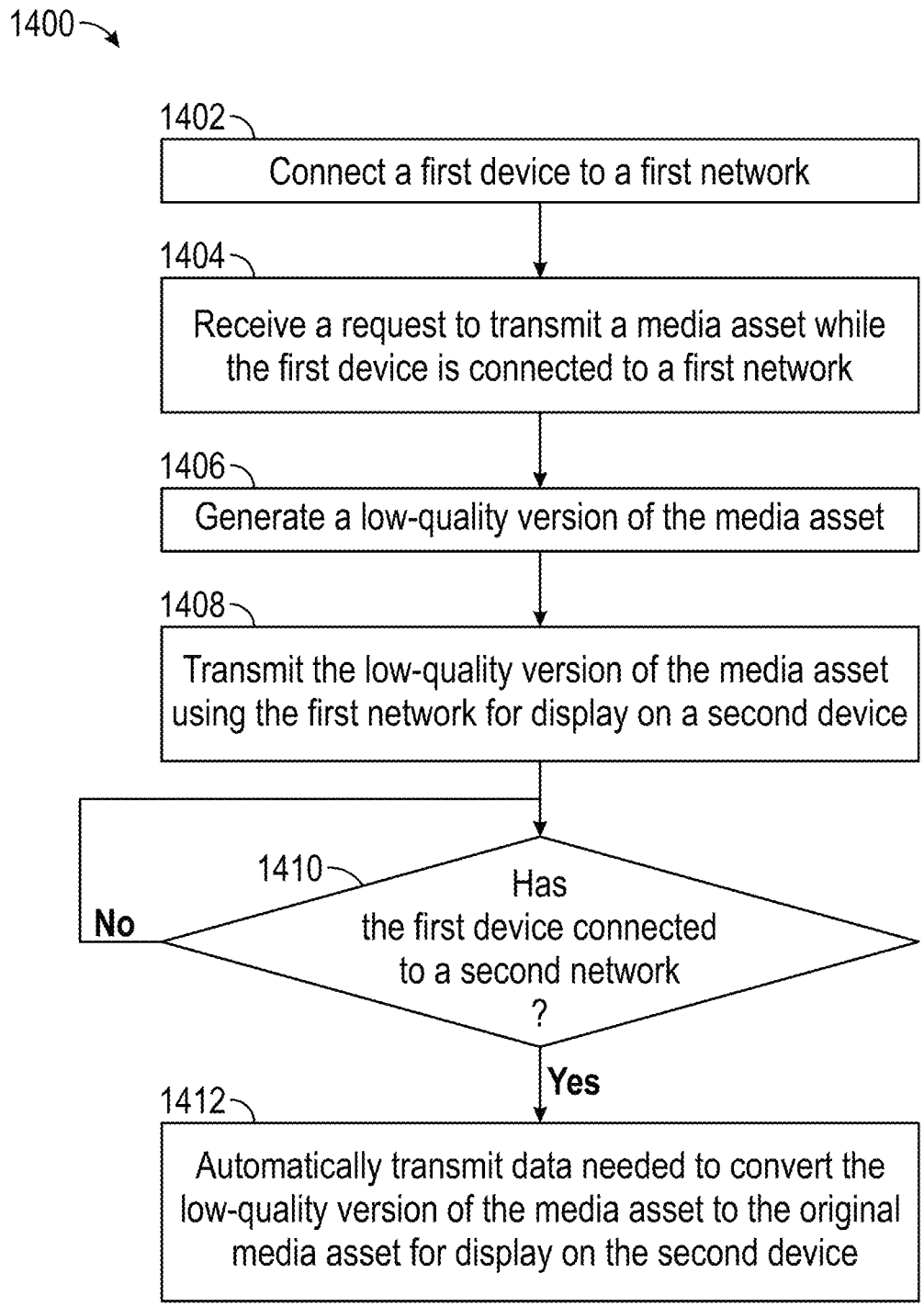
FIG. 14 is a schematic illustration of a process for adjusting media asset quality based on network characteristics, in accordance with embodiments of the disclosure.

FIG. 14 is a schematic illustration of a process for adjusting media asset quality based on network characteristics, in accordance with embodiments of the disclosure. The process 1400 shown in FIG. 14 may be implemented, in whole or in part, by one or more systems or devices described herein. In some embodiments, instructions for applications that provision the device are stored in non-transitory memory, such as discussed in relation to FIGS. 1, 15, and 16, and when executed, perform operations of the process 1400.

The process 1400 begins at operation 1402 with control circuitry (e.g., control circuitry 190 in FIG. 1 or control circuitry 1512, 1611, discussed below in relation to FIGS. 15 and 16) connecting to a first network (e.g., terrestrial network 104 or satellite constellation 110 in FIG. 1, SATCOM network 210 in FIGS. 2, 4, and 5, or first or second network 784, 786 in FIG. 7).

The process 1400 continues to operation 1404 with I/O circuitry (e.g., I/O circuitry 192 in FIG. 1 or I/O path 1516, 1612, discussed below in relation to FIGS. 15 and 16) receiving a request to transmit a media asset while the first device is connected to the first network. In some embodiments, the I/O circuitry receives the request using a user interface (e.g., user interface 130, 1168 in FIGS. 1 and 11 or user input interface 1502, discussed below in relation to FIG. 15) of a first device (e.g., device 102 in FIGS. 1, 2, and 11; device 902 in FIG. 9; or device 1500 or user equipment 1607, 1608, 1610, discussed below in relation to FIGS. 15 and 16).

The process 1400 continues to operation 1406 with the control circuitry generating a low-quality version of the media asset. In some embodiments, a file size of the low-quality version of the media asset is smaller than a file size of the original media asset.

The process 1400 continues to operation 1408 with the I/O circuitry transmitting the low-quality version of the media asset using the first network. In some embodiments, the low-quality version is transmitted by the first device. In some embodiments, the low-quality version is received by a second device (e.g., device 102 in FIGS. 1, 2, and 11; device 902 in FIG. 9; or device 1500 or user equipment 1607, 1608, 1610, discussed below in relation to FIGS. 15 and 16). In some implementations, the low-quality version is transmitted for display on the second device. In some embodiments, the I/O circuitry transmits and/or receives using transceiver circuitry (e.g., transceiver circuitry 132 in FIGS. 1 and 2 or transceiver circuitry 1508, discussed below in relation to FIG. 15) of the device. In some embodiments, the control circuitry transmits and/or receives requests.

The process 1400 continues to operation 1410 with the control circuitry determining whether the first device has connected to a second network (e.g., terrestrial network 104 or satellite constellation 110 in FIG. 1, SATCOM network 210 in FIGS. 2, 4, and 5, or first or second network 784, 786 in FIG. 7). In some embodiments, the second network, when compared to the first network, has any of a faster speed, higher bandwidth, or increased data limits. If the determination is no, the control circuitry continues to monitor the network connection of the first device. If the determination is yes, the process 1400 continues to operation 1412 with the I/O circuitry automatically transmitting data needed to convert the low-quality version of the media asset to the original media asset for display on the second device. In some embodiments, the data needed to convert the low-quality version is transmitted over the second network. In some embodiments, the data is transmitted from the first device.

In some embodiments, the device or control circuitry executes the network status application to determine status or availability of any of the first network or second network. In some embodiments, the device or control circuitry executes the device provisioning application to connect to any of the first network or second network. In some embodiments, the device or control circuitry executes the quality management application to monitor the quality of, or characteristics of, any of the first network or second network. In some embodiments, the device or control circuitry executes the quality management application to perform any of operations 1406, 1408, or 1412.

Figure 15:
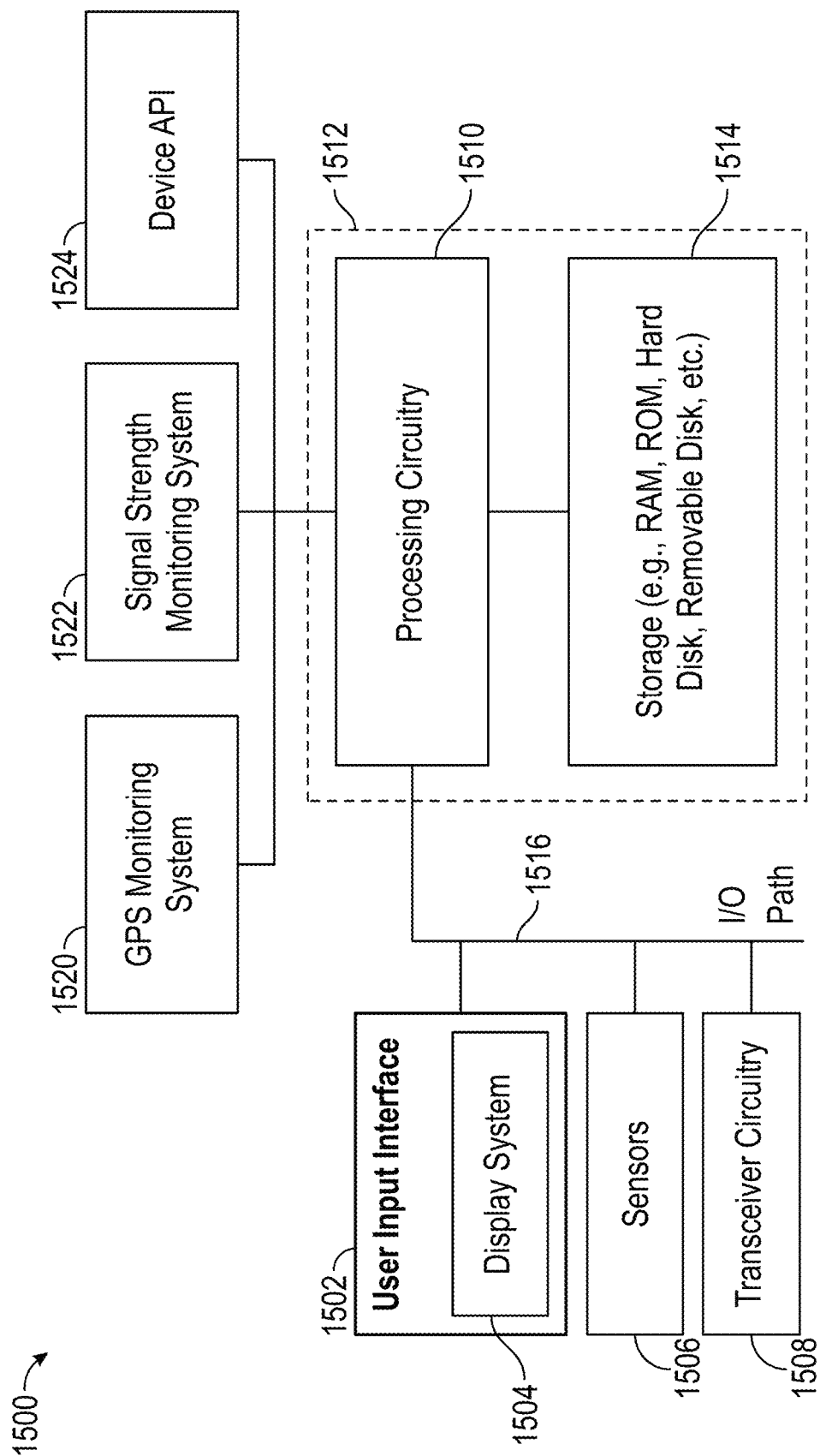
FIG. 15 depicts example devices and related hardware for provisioning a device to a satellite network provider without service from a terrestrial network, in accordance with some embodiments of this disclosure.

FIG. 15 depicts example devices and related hardware for provisioning a device to a satellite network provider without service from a terrestrial network, in accordance with some embodiments of this disclosure. FIG. 15 shows a generalized embodiment of illustrative device 1500 (or, e.g., device 102 in FIGS. 1, 2, and 11; device 902 in FIG. 9; or user equipment 1607, 1608, 1610, discussed below in relation to FIG. 16) that may be used as part of a system (e.g., system 100, 572 in FIGS. 1 and 5). In some implementations, device 1500 receives data via I/O path 1516, and processes input data and output data using I/O circuitry (e.g., I/O circuitry 192 in FIG. 1). In one example, I/O path 1516 provides content (e.g., data structures, user profile information, Internet content, content available over a local area network (LAN) or wide area network (WAN), and/or other content) and data (e.g., data structures, data from sensors 1506) to control circuitry 1512, which includes processing circuitry 1510 and storage 1514. In some implementations, control circuitry 1512 is used to send and receive commands, requests, and other suitable data using I/O path 1516. In some implementations, device 1500 includes and/or interfaces with a GPS monitoring system 1520, signal strength monitoring system 1522, or device API 1524 of the device.

In some embodiments, control circuitry 1512 is based on any suitable processing circuitry such as processing circuitry 1510. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry 1510 is distributed across multiple separate processors or processing units. In some embodiments, control circuitry 1512 executes instructions for multiple applications stored in non-transitory memory (e.g., storage 1514). Specifically, control circuitry 1512 may be instructed by a device provisioning application or quality management application, to name a few examples, to perform the functions discussed in this disclosure. For example, the device provisioning application provides instructions to control circuitry 1512 to provision the device 1500 to connect to a satellite network provider (e.g., satellite network providers 116, 118 or 216 in FIGS. 1 and 2), control the device 1500 based on network performance, or execute a received input from I/O path 1516. In some implementations, any action performed by control circuitry 1512 is based on instructions received from the device provisioning application.

In some client/server-based embodiments, control circuitry 1512 includes communications circuitry (e.g., transceiver circuitry 1508) suitable for communicating with an application server or other networks or servers. In one example, the instructions for carrying out the above-mentioned functionality are stored on the application server. Communications circuitry may include SATCOM, a 5G or 6G modem, a cable modem, an integrated-services digital network (ISDN) modem, a digital subscriber line (DSL) modem, a telephone modem, Ethernet card, a wireless modem, and/or one or more CAN busses or Ethernet transceivers for communications with other equipment, or any other suitable communications circuitry. Such communications may involve the Internet or any other suitable communications networks or paths (which are described in more detail in connection with FIG. 16). In some implementations, any action performed by communications circuitry is based on instructions received from the device provisioning application.

In some embodiments, the sensors 1506 are arranged inside and/or outside of the device 1500. In some implementations, the sensors 1506 are used for capturing any data described herein, generating various data, and making various determinations and identifications as discussed in this disclosure. The sensors 1506 may include various sensors, such as one or more ultrasonic sensors, cameras, radar, and lidar to provide awareness of the surroundings of the device 1500. For example, the sensors 1506 are used by the control circuitry 1512 to (i) determine a current or last known position of the device 1500, (ii) determine a trajectory of the device 1500, or (iii) monitor a signal strength. The sensors 1506 may include a GPS receiver or other positioning hardware. The sensors 1506 may also include sensor circuitry which enables the sensors 1506 to operate and receive and transmit data, to and from, the control circuitry 1512 and various other components of the device 1500. In addition, communications circuitry may include circuitry that enables peer-to-peer communication of user equipment devices, or communication of user equipment devices in locations remote from each other (described in more detail below).

In some embodiments, memory is an electronic storage device provided as storage 1514 that is part of control circuitry 1512. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1514 may be used to store various types of content described herein as well as content data and application data that are described above. In some implementations, nonvolatile memory is also used (e.g., to launch a boot-up routine and other instructions). In some implementations, cloud-based storage is used to supplement storage 1514 or instead of storage 1514.

In some embodiments, sensors 1506 and/or control circuitry 1512 include digital-to-analog converter circuitry and analog-to-digital converter circuitry for converting between digital and analog signals.

The multiple applications may be implemented using any suitable architecture. For example, each application is a stand-alone application wholly implemented on device 1500. In such an approach, instructions of the applications are stored locally (e.g., in storage 1514), and data for use by the applications is downloaded on a periodic basis (e.g., from an out-of-band feed, from an Internet resource, or using another suitable approach). In some embodiments, control circuitry 1512 retrieves instructions of the application from storage 1514 and process the instructions to carry out any of the functions discussed herein. Based on the processed instructions, control circuitry 1512 determines what action to perform when input is received from user input interface 1502. For example, a request to provision the device 1500 to a SATCOM network is indicated by the processed instructions when the user input interface 1502 indicates that a user input indicates to connect to the SATCOM network. In some examples, the sensors 1506 are fitted with their own processing circuitry (similar to processing circuitry 1510) and storage (similar to storage 1514) and communicate via an I/O path (similar to I/O path 1516) to another processing circuitry and/or storage. Similarly, in some implementations, sensors 1506 and user input interface 1502 are connected to another processing circuitry and/or storage. This architecture enables various components to be separated and may segregate functions to provide failure separation and redundancy. In some embodiments, the user input interface 1502 includes a user device, such as user equipment 1607, 1608, 1610 discussed below in relation to FIG. 16.

In some embodiments, the multiple applications are client/server-based applications. Data for use by a thick or thin client implemented on device 1500 is retrieved on-demand by issuing requests to a server remote to the device 1500. In one example of a client/server-based application, control circuitry 1512 runs a web browser that interprets web pages provided by a remote or edge server. For example, the remote server stores the instructions for the application in a storage device. The remote server processes the stored instructions using circuitry (e.g., control circuitry 1512) and carry out one or more of the functions discussed herein. The client device receives data from the remote server and also carries out one or more of the functions discussed herein locally on device 1500. This way, the processing of the instructions is performed at least partially remotely by the server while other functions are executed locally on device 1500. In some embodiments, device 1500 receives inputs from a user via user input interface 1502 and transmits those inputs to the remote server for processing. For example, device 1500 transmits, via one or more antenna, communication to the remote server, indicating that a user interface element was selected via user input interface 1502. The remote server processes instructions in accordance with that input and generate a display of content identifiers associated with the selected user interface element. The generated display is then transmitted to device 1500 for presentation to the user.

In some embodiments, at least one of the multiple applications is downloaded and interpreted or otherwise run by an interpreter or virtual machine (run by control circuitry 1512). In some implementations, the at least one application operates in connection with or as a part of an electronic control unit (ECU) of a vehicle (e.g., user equipment 1610 in FIG. 16). In one example, the ECU is one of many ECUs of the vehicle, wherein each ECU operates to control a particular set of functions of the vehicle, such as engine controls, power train controls, transmission controls, brake controls, etc. The at least one application operates in connection with one or more ECUs of the vehicle in order to carry out the functions described herein.

Figure 16:
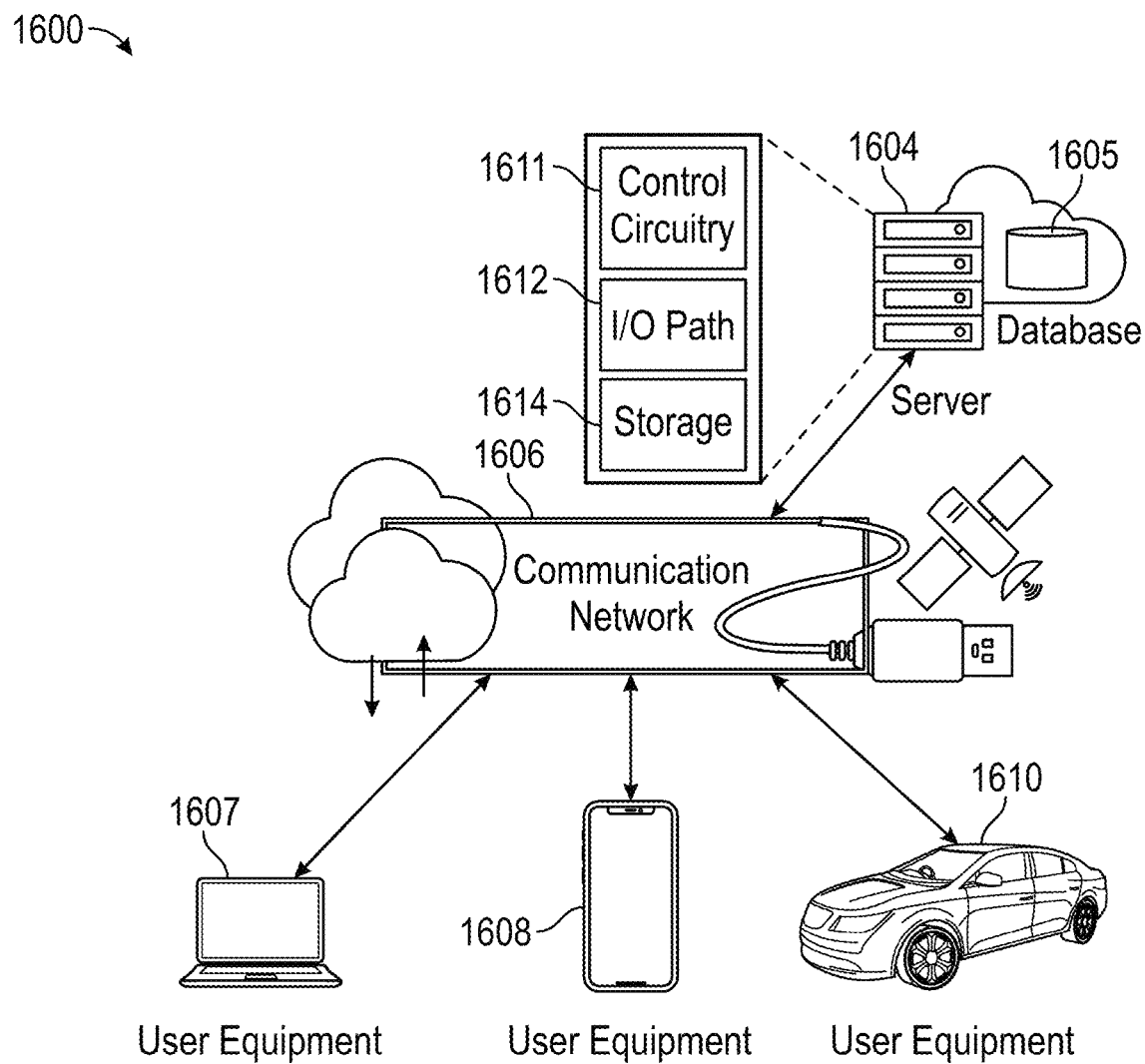
FIG. 16 depicts example systems, servers, and related hardware for enabling a device provisioning application to carry out the functions described herein, in accordance with some embodiments of this disclosure.

Device 1500 of FIG. 15 can be implemented in system 1600 of FIG. 16 as user equipment 1607, 1608, 1610, or any other type of user equipment. For simplicity, these devices may be referred to herein collectively as interface equipment or interface equipment devices and may be substantially similar to the device 1500 described above. In some embodiments, any of the user equipment 1607, 1608, 1610, which includes the control circuitry 1512, the I/O path 1516, and storage 1514 discussed in relation to FIG. 15, communicates over the communication network 1606 with a server 1604 to send and receive data. Interface equipment devices, on which one or more functions of multiple applications described herein may be implemented, may function as stand-alone devices or may be part of a network of devices.

Various network configurations of devices may be implemented and are discussed in more detail below.

FIG. 16 depicts example systems, servers, and related hardware for enabling a device provisioning application to carry out the functions described herein, in accordance with some embodiments of this disclosure.

User equipment 1607, 1608, 1610 (e.g., device 102 in FIGS. 1, 2, and 11 or device 902 or 1500 in FIGS. 9 and 15) and/or other connected devices (e.g., sensors 1506 in FIG. 15) or suitable devices, or any combination thereof, may be coupled to communication network 1606. In the depicted embodiment, the user equipment 1607 comprises a personal computer (e.g., laptop), user equipment 1608 comprises a smartphone, and user equipment 1610 comprises a vehicle. Communication network 1606 may be one or more networks including the Internet, SATCOM network (e.g., satellite constellation 110 in FIG. 1, SATCOM network 210 in FIGS. 2, 4, and 5, or first or second network 784, 786 in FIG. 7), a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1606) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 16 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth®, infrared, IEEE 702-11x, etc.), or other short-range communication via wired or wireless paths. The user equipment devices may also communicate with each other directly through an indirect path via communication network 1606.

System 1600 may comprise one or more servers 1604 and/or one or more social network services. In some embodiments, the media system may be executed at one or more of control circuitry 1611 of server 1604 (and/or control circuitry of user equipment 1607, 1608, 1610). In some embodiments, a current or last known location of a user equipment, history of previous locations or historical movement data of the user equipment, different versions of media assets (e.g., low-quality, high-quality, original quality, or progressive jpegs), current and/or previously used e-SIMs or e-SIM profiles, user preferences, a user profile associated with or from the user equipment, payment information, or any other suitable data structure or any combination thereof, may be stored at database 1605 maintained at or otherwise associated with server 1604, and/or at storage of one or more of user equipment 1607, 1608, 1610.

In some embodiments, server 1604 may include control circuitry 1611 and storage 1614 (e.g., RAM, ROM, Hard Disk, Removable Disk, etc.). Storage 1614 may store one or more databases 1605. Server 1604 may also include an I/O path 1612. I/O path 1612 may provide media consumption data, social networking data, device information, or other data, over a local area network (LAN) or wide area network (WAN), and/or other content and data to control circuitry 1611, which may include processing circuitry, and storage 1614. Control circuitry 1611 may be used to send and receive commands, requests, and other suitable data using I/O path 1612. I/O path 1612 may connect control circuitry 1611 to one or more communications paths. I/O path 1612 may comprise I/O circuitry.

Control circuitry 1611 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1611 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1611 executes instructions for an emulation system application stored in memory (e.g., storage 1614). Memory may be an electronic storage device provided as storage 1614 that is part of control circuitry 1611.

The embodiments discussed above are intended to be illustrative and not limiting. One skilled in the art would appreciate that individual aspects of the apparatus and methods discussed herein may be omitted, modified, combined, and/or rearranged without departing from the scope of the disclosure. Only the claims that follow are meant to set bounds as to what the present disclosure includes.

What is claimed is:

1. A method, comprising:
   transmitting, by a user device, an encrypted handshake request to access a satellite communication network, wherein the handshake request to access the satellite communication network is encrypted using a public key of an operator of the satellite communication network;
   receiving, from the satellite communication network, a proxy certificate that was acquired from a certificate authority;
   verifying, by the user device, the proxy certificate using a public key of the certificate authority;
   transmitting, by the user device, an encrypted request for an e-SIM profile to access the satellite communication network through a satellite network provider, wherein the request for an e-SIM profile is encrypted using information from the proxy certificate;
   receiving, from the satellite communication network, a certificate of a satellite network provider and a plurality of e-SIM profiles associated with the satellite network provider;
   transmitting, by the user device, a selection of one of the plurality of e-SIM profiles, wherein the selection is encrypted using information from the certificate of the satellite network provider;
   receiving, from the satellite communication network, a configuration that corresponds to the selected e-SIM profile, wherein the configuration that corresponds to the selected e-SIM profile is encrypted using a key of the satellite network provider; and
   accessing the satellite communication network using the received configuration that corresponds to the selected e-SIM profile.

2. The method of claim 1, further comprising determining the user device has lost connectivity to a terrestrial network, wherein the transmitting the encrypted handshake request is based at least in part on determining the user device has lost connectivity to the terrestrial network.

3. The method of claim 1, further comprising determining, by the user device, a signal strength of a terrestrial network will fall below a signal strength threshold within a degradation time period, wherein:
the user device is connected to the terrestrial network; and
the transmitting the encrypted handshake request is based at least in part on determining the signal strength of the terrestrial network will fall below the signal strength threshold within the degradation time period.

4. The method of claim 1, wherein the transmitting the encrypted handshake request causes a system of the operator of the satellite communication network to at least one of:
decrypt the encrypted handshake request using a key of the operator of the satellite communication network; or
request verification, from the certificate authority, of a certificate received from the user device in the encrypted handshake request.

5. The method of claim 1, wherein the encrypted request for an e-SIM causes a system of the satellite network provider to:
validate the request for an e-SIM using the public key of the certificate authority; and
transmit the certificate of a satellite network provider to the user device, wherein transmission of the certificate of the satellite network provider is encrypted using a key of the satellite network provider.

6. The method of claim 1, wherein the transmitting the selection of the e-SIM profile causes a system of the satellite network provider to generate the selected e-SIM profile.

7. The method of claim 1, wherein the user device does not have prior knowledge of the satellite network provider.

8. The method of claim 1, further comprising:
receiving, using a user interface of the user device, a request to transmit a media asset;
determining a connection speed to the satellite communication network is below a speed threshold; and
based at least in part on determining the connection speed to the satellite communication network is below the speed threshold:
generating a low-quality version of the media asset having a smaller file size than the original media asset; and
transmitting, from the user device, the low-quality version of the media asset to the satellite communication network to be routed to a different user device.

9. The method of claim 8, further comprising:
determining (i) a connection speed to the satellite communication network is at or above the speed threshold or (ii) the user device has connected to a terrestrial network; and
based at least in part on the determining (i) or (ii):
transmitting, from the user device, the original media asset to the satellite communication network to be routed to the different user device to replace the low-quality version of the media asset.

10. The method of claim 9, further comprising:
generating for display, on the user device, the low-quality version of the media asset in a sequential conversation thread of a messaging application;
receiving, from the different user device, a reply to the low-quality version of the media asset in the sequential conversation thread; and
based at least in part on the determining (i) or (ii):
generating for display, on the user device, the original media asset in the sequential conversation thread, wherein the original media asset replaces the low-quality version of the media asset at the same sequential position in the sequential conversation thread.

11. A system, comprising:
transceiver circuitry configured to transmit an encrypted handshake request to access a satellite communication network, wherein the handshake request to access the satellite communication network is encrypted using a public key of an operator of the satellite communication network;
input/output circuitry configured to receive, from the satellite communication network, a proxy certificate that was acquired from a certificate authority; and
control circuitry configured to verify the proxy certificate using a public key of the certificate authority;
wherein the transceiver circuitry is further configured to transmit an encrypted request for an e-SIM profile to access the satellite communication network through a satellite network provider, wherein the request for an e-SIM profile is encrypted using information from the proxy certificate;
wherein the input/output circuitry is further configured to receive, from the satellite communication network, a certificate of a satellite network provider and a plurality of e-SIM profiles associated with the satellite network provider;
wherein the transceiver circuitry is further configured to transmit a selection of one of the plurality of e-SIM profiles, wherein the selection is encrypted using information from the certificate of the satellite network provider;
wherein the input/output circuitry is further configured to receive, from the satellite communication network, a configuration that corresponds to the selected e-SIM profile, wherein the configuration that corresponds to the selected e-SIM profile is encrypted using a key of the satellite network provider; and
wherein the control circuitry is further configured to access the satellite communication network using the received configuration that corresponds to the selected e-SIM profile.

12. The system of claim 11, wherein the control circuitry is further configured to determine the system has lost connectivity to a terrestrial network, wherein transmitting the encrypted handshake request is based at least in part on determining the system has lost connectivity to the terrestrial network.

13. The system of claim 11, wherein the control circuitry is further configured to determine a signal strength of a terrestrial network will fall below a signal strength threshold within a degradation time period, wherein:
the system is connected to the terrestrial network; and
transmitting the encrypted handshake request is based at least in part on determining the signal strength of the terrestrial network will fall below the signal strength threshold within the degradation time period.

14. The system of claim 11, wherein transmitting the encrypted handshake request causes a system of the operator of the satellite communication network to at least one of:
decrypt the encrypted handshake request using a key of the operator of the satellite communication network; or request verification, from the certificate authority, of a certificate received from the system in the encrypted handshake request.

15. The system of claim 11, wherein the encrypted request for an e-SIM causes a system of the satellite network provider to:
   validate the request for an e-SIM using the public key of the certificate authority; and
   transmit the certificate of a satellite network provider to the system, wherein transmission of the certificate of the satellite network provider is encrypted using a key of the satellite network provider.

16. The system of claim 11, wherein transmitting the selection of the e-SIM profile causes a system of the satellite network provider to generate the selected e-SIM profile.

17. The system of claim 11, wherein the system does not have prior knowledge of the satellite network provider.

18. The system of claim 11, wherein:
   the input/output circuitry is further configured to receive, using a user interface of the system, a request to transmit a media asset;
   the control circuitry is further configured to:
      determine a connection speed to the satellite communication network is below a speed threshold; and
      based at least in part on determining the connection speed to the satellite communication network is below the speed threshold, generate a low-quality version of the media asset having a smaller file size than the original media asset; and
   the transceiver circuitry is further configured to, based at least in part on determining the connection speed to the satellite communication network is below the speed threshold:
      transmit the low-quality version of the media asset to the satellite communication network to be routed to a different system.

19. The system of claim 18, wherein:
   the control circuitry is further configured to determine (i) a connection speed to the satellite communication network is at or above the speed threshold or (ii) the system has connected to a terrestrial network; and
   the transceiver circuitry further configured to, based at least in part on the determining (i) or (ii):
      transmit the original media asset to the satellite communication network to be routed to the different system to replace the low-quality version of the media asset.

20. The system of claim 19, wherein:
   the control circuitry is further configured to generate for display the low-quality version of the media asset in a sequential conversation thread of a messaging application;
   the input/output circuitry is further configured to receive, from the different system, a reply to the low-quality version of the media asset in the sequential conversation thread; and
   the control circuitry is further configured to, based at least in part on the determining (i) or (ii):
      generate for display the original media asset in the sequential conversation thread, wherein the original media asset replaces the low-quality version of the media asset at the same sequential position in the sequential conversation thread.

* * * * *